(12) United States Patent
McBride et al.

(10) Patent No.: US 11,144,868 B1
(45) Date of Patent: Oct. 12, 2021

(54) VISUAL GRAPHIC TRACKING OF ITEM SHIPMENT AND DELIVERY

(71) Applicant: Stamps.com Inc., El Segundo, CA (US)

(72) Inventors: Kenneth Thomas McBride, Hermosa Beach, CA (US); John Roland Clem, Hermosa Beach, CA (US); Charles John Atkinson, El Segundo, CA (US)

(73) Assignee: STAMPS.COM INC., El Segundo, CA (US)

( * ) Notice: Subject to any disclaimer, the term of this patent is extended or adjusted under 35 U.S.C. 154(b) by 939 days.

(21) Appl. No.: 15/712,051

(22) Filed: Sep. 21, 2017

Related U.S. Application Data

(63) Continuation of application No. 13/705,935, filed on Dec. 5, 2012, now abandoned.

(51) Int. Cl.
 *G06Q 10/08* (2012.01)
(52) U.S. Cl.
 CPC ..... *G06Q 10/0833* (2013.01); *G06Q 10/0834* (2013.01)
(58) Field of Classification Search
 CPC .............. G06Q 10/0833; G06Q 10/0834
 See application file for complete search history.

(56) References Cited

U.S. PATENT DOCUMENTS

| | | | | |
|---|---|---|---|---|
| 5,122,959 A | * | 6/1992 | Nathanson | G08G 1/202 340/993 |
| 5,414,809 A | * | 5/1995 | Hogan | G06F 3/0481 715/765 |
| 5,437,010 A | * | 7/1995 | Blackman | G07B 17/00193 700/180 |
| 5,703,783 A | | 12/1997 | Allen et al. | |
| 5,802,492 A | * | 9/1998 | DeLorme | G01C 21/3476 340/990 |

(Continued)

OTHER PUBLICATIONS

Jinghua Xu, "Dynamic Freight Traffic simulation providing real time information", published by Proceedings of the 2003 Winter Simulation Conference in 2003 (Year: 2003).*

(Continued)

*Primary Examiner* — Omar Zeroual
(74) *Attorney, Agent, or Firm* — Pillsbury Winthrop Shaw Pittman LLP

(57) ABSTRACT

Exemplary embodiments of the present invention would determine exemplary projected routes, delivery dates, times and rates for multiple carriers and multiple delivery services/methods. Exemplary embodiments would generate and provide an exemplary interactive graphic comparison mapping of the exemplary projected carrier-specific, delivery-service-specific routes, and associated projected delivery dates, times and rates. Exemplary embodiments of the present invention would generate and provide an exemplary interactive graphic mapping of a projected carrier-specific, delivery-service-specific route, and associated projected delivery date, time and rate for a user-selected carrier and delivery service/method. Exemplary embodiments of the present invention would then track shipping/mailing progress and delivery status of the item according to carrier-provided shipping/mailing progress and delivery status "events," such as, for example, carrier-provided item scanning events.

18 Claims, 12 Drawing Sheets

(56) References Cited

U.S. PATENT DOCUMENTS

| | | | | |
|---|---|---|---|---|
| 5,948,040 A * | 9/1999 | DeLorme | G09B 29/106 | 701/426 |
| 5,995,950 A * | 11/1999 | Barns-Slavin | G06Q 10/08 | 705/402 |
| 5,999,882 A * | 12/1999 | Simpson | G06Q 10/047 | 702/3 |
| 6,012,065 A * | 1/2000 | Boucher | G06F 9/4493 | |
| 6,018,725 A * | 1/2000 | Boucher | G06F 8/60 | 705/401 |
| 6,064,995 A | 5/2000 | Sansone et al. | | |
| 6,571,213 B1 * | 5/2003 | Altendahl | G06Q 10/047 | 705/330 |
| 6,611,686 B1 * | 8/2003 | Smith | G06Q 10/08 | 340/426.19 |
| 6,879,962 B1 * | 4/2005 | Smith | G06Q 10/025 | 705/22 |
| 7,746,343 B1 * | 6/2010 | Charaniya | G06F 16/2425 | 345/428 |
| 8,131,651 B1 * | 3/2012 | Bennett | G06Q 10/06311 | 705/335 |
| 8,428,870 B2 * | 4/2013 | Berry | G06Q 10/06 | 701/410 |
| 8,849,551 B2 * | 9/2014 | Gadler | G01C 21/32 | 701/117 |
| 8,886,216 B1 * | 11/2014 | Crossno | G06Q 10/0833 | 455/456.1 |
| 2001/0025268 A1 * | 9/2001 | Hnat | G06Q 40/04 | 705/37 |
| 2001/0040513 A1 | 11/2001 | McDonald | | |
| 2001/0044729 A1 * | 11/2001 | Pomerance | G06Q 50/182 | 705/309 |
| 2002/0019759 A1 * | 2/2002 | Arunapuram | G06Q 10/04 | 705/7.26 |
| 2002/0032573 A1 * | 3/2002 | Williams | G06Q 10/08 | 705/335 |
| 2002/0046191 A1 * | 4/2002 | Joao | G06Q 30/0283 | 705/400 |
| 2002/0065738 A1 * | 5/2002 | Riggs | G06Q 10/0833 | 705/334 |
| 2002/0099567 A1 * | 7/2002 | Joao | G06Q 10/087 | 340/539.13 |
| 2002/0107785 A1 * | 8/2002 | Melchior | G06Q 20/10 | 705/37 |
| 2002/0120475 A1 | 8/2002 | Morimoto | | |
| 2002/0138656 A1 * | 9/2002 | Hickey | G06F 9/454 | 709/250 |
| 2002/0169542 A1 * | 11/2002 | Katayama | G06Q 10/047 | 701/428 |
| 2003/0033164 A1 * | 2/2003 | Fallings | G06Q 10/02 | 705/6 |
| 2003/0040944 A1 * | 2/2003 | Hileman | G06Q 10/08 | 705/5 |
| 2003/0046133 A1 * | 3/2003 | Morley | G06Q 10/0639 | 705/7.12 |
| 2003/0078779 A1 * | 4/2003 | Desai | H04M 3/4878 | 704/257 |
| 2003/0097287 A1 * | 5/2003 | Franz | G06Q 10/087 | 705/28 |
| 2003/0101143 A1 | 5/2003 | Montgomery et al. | | |
| 2003/0167240 A1 | 9/2003 | Napier et al. | | |
| 2003/0182052 A1 * | 9/2003 | DeLorme | G01C 21/3679 | 701/533 |
| 2004/0004119 A1 * | 1/2004 | Baldassari | G06Q 10/08 | 235/384 |
| 2004/0103117 A1 * | 5/2004 | Segler | G06F 16/29 | |
| 2004/0202154 A1 * | 10/2004 | Aklepi | G06Q 10/08 | 370/352 |
| 2004/0225624 A1 * | 11/2004 | Reynolds | G06Q 10/0833 | 705/401 |
| 2004/0243452 A1 * | 12/2004 | Barton | G06Q 10/083 | 705/337 |
| 2004/0254808 A1 * | 12/2004 | Bennett | G06Q 30/04 | 705/26.1 |
| 2004/0264739 A1 * | 12/2004 | Das | G07B 17/00024 | 382/101 |
| 2005/0038758 A1 * | 2/2005 | Hilbush | G06Q 10/06311 | 705/402 |
| 2005/0131576 A1 * | 6/2005 | De Leo | G08G 1/202 | 700/223 |
| 2005/0246359 A1 * | 11/2005 | Robbins | G06Q 10/08 | |
| 2005/0251330 A1 * | 11/2005 | Waterhouse | G08G 1/202 | 701/465 |
| 2005/0278063 A1 * | 12/2005 | Hersh | G06Q 10/06311 | 700/216 |
| 2006/0122949 A1 | 6/2006 | Poulin | | |
| 2006/0136237 A1 * | 6/2006 | Spiegel | G06Q 10/083 | 705/330 |
| 2006/0145837 A1 * | 7/2006 | Horton | G08G 1/202 | 340/539.13 |
| 2006/0184403 A1 * | 8/2006 | Scott | G06Q 10/06316 | 705/338 |
| 2006/0229895 A1 * | 10/2006 | Kodger, Jr. | G06Q 10/08 | 705/333 |
| 2006/0271387 A1 * | 11/2006 | Gruger | G06Q 10/0835 | 705/26.1 |
| 2007/0016363 A1 * | 1/2007 | Huang | G08G 1/202 | 701/533 |
| 2007/0192216 A1 * | 8/2007 | Arnold | G06Q 30/06 | 705/28 |
| 2007/0294028 A1 * | 12/2007 | Gray | G01C 21/343 | 701/533 |
| 2007/0299686 A1 * | 12/2007 | Hu | G06Q 20/20 | 705/407 |
| 2008/0004967 A1 * | 1/2008 | Gillen | G06Q 20/209 | 705/24 |
| 2008/0061967 A1 * | 3/2008 | Corrado | G06K 19/07345 | 340/539.26 |
| 2008/0133659 A1 * | 6/2008 | Aldrey | G06Q 10/08 | 709/204 |
| 2008/0215976 A1 * | 9/2008 | Bierner | G06F 40/174 | 715/708 |
| 2009/0037095 A1 * | 2/2009 | Jani | G06Q 10/0834 | 701/533 |
| 2009/0099770 A1 * | 4/2009 | Cheung | G01C 21/3407 | 701/426 |
| 2009/0170482 A1 * | 7/2009 | Alessio | H04M 3/42221 | 455/414.1 |
| 2009/0281929 A1 | 11/2009 | Boitet et al. | | |
| 2009/0312947 A1 * | 12/2009 | Brandis, Jr. | G01C 21/3423 | 701/469 |
| 2010/0169000 A1 * | 7/2010 | Overgoor | G01C 21/34 | 701/465 |
| 2010/0185476 A1 * | 7/2010 | Eager | G06Q 10/063 | 705/7.11 |
| 2010/0205022 A1 * | 8/2010 | Brown | G06Q 10/063 | 705/7.11 |
| 2010/0223173 A1 * | 9/2010 | Kadaba | G06Q 10/0835 | 705/34 |
| 2010/0228574 A1 * | 9/2010 | Mundinger | G01C 21/3423 | 705/4 |
| 2010/0235210 A1 * | 9/2010 | Nadrotowicz, Jr. | G06Q 10/06311 | 705/7.21 |
| 2010/0274609 A1 * | 10/2010 | Shoemaker | G06Q 10/08 | 705/333 |
| 2010/0332402 A1 * | 12/2010 | Kantarjiev | G06Q 10/08 | 705/304 |
| 2011/0022533 A1 * | 1/2011 | Lau | G06Q 10/0833 | 705/332 |
| 2011/0161117 A1 * | 6/2011 | Busque | G06Q 20/3278 | 705/4 |
| 2011/0208667 A1 * | 8/2011 | Mackenzie | G06Q 10/08 | 705/336 |
| 2011/0221573 A1 * | 9/2011 | Huat | G05B 15/02 | 340/10.1 |
| 2011/0314376 A1 * | 12/2011 | Dearman | G06F 3/0481 | 715/711 |

(56) References Cited

U.S. PATENT DOCUMENTS

| | | | | |
|---|---|---|---|---|
| 2012/0030133 | A1* | 2/2012 | Rademaker | G06Q 10/08 705/333 |
| 2012/0035848 | A1* | 2/2012 | Yonezawa | G01C 21/3492 701/414 |
| 2012/0078743 | A1* | 3/2012 | Betancourt | G06Q 10/08355 705/26.3 |
| 2012/0169761 | A1* | 7/2012 | Leah | G09B 29/005 345/619 |
| 2012/0173450 | A1* | 7/2012 | McCall | G06Q 10/08355 705/341 |
| 2013/0024390 | A1* | 1/2013 | Zlobinsky | G06Q 10/087 705/319 |
| 2013/0138574 | A1* | 5/2013 | McCall | G06Q 10/083 705/334 |
| 2013/0268191 | A1* | 10/2013 | Telang | G08G 1/20 701/468 |
| 2013/0297523 | A1 | 11/2013 | Karr et al. | |
| 2013/0325893 | A1* | 12/2013 | Asay | G06Q 10/083 707/769 |
| 2013/0342343 | A1* | 12/2013 | Harring | H04L 63/102 340/521 |
| 2013/0346336 | A1* | 12/2013 | Murphy | G06Q 10/083 705/333 |
| 2016/0069705 | A1* | 3/2016 | Brenner | G01C 21/34 701/428 |

OTHER PUBLICATIONS

Office Action for U.S. Appl. No. 13/828,800 dated Feb. 3, 2015, pp. 1-25, USPTO.
Office Action for U.S. Appl. No. 13/828,800 dated Jun. 2, 2016, pp. 1-41, USPTO.
Office Action for U.S. Appl. No. 13/828,800 dated Dec. 14, 2016, pp. 1-22, USPTO.
Office Action for U.S. Appl. No. 13/828,800 dated Aug. 21, 2015, pp. 1-36, USPTO.

* cited by examiner

Website

File  Edit  View  Favorites  Tools  Help

← Back  →  ⊗  ⌂  🔍Search  ☆Favorites

400

Item Summary  — Carrier  401  Delivery Service  410
From: City X       USPS
To:   City Y       Carrier X
Item Pkg: Envelope Carrier Y
Item Type: Printed Matter
Item Dimensions: N/A
Weight    2 ounces

405

Rate: 420

Payment Method: 430

Credit Card Type: 440

CID: 450

Enter 480

□ Provide Visual Tracking
492 Another email ▽  Post To
496 xxx@yyy.com  Tell us Where

VISUAL GRAPHIC TRACKING OF ITEM SHIPMENT AND DELIVERY

CROSS-REFERENCE TO RELATED APPLICATIONS

This application is a continuation of U.S. patent application Ser. No. 13/705,935, filed on Dec. 5, 2012 and entitled "VISUAL GRAPHIC TRACKING OF ITEM SHIPMENT AND DELIVERY," the entire content of which is hereby incorporated herein by reference in its entirety.

FIELD OF THE INVENTION

The field of the present invention is mail piece shipment and delivery tracking, and more specifically, graphically depicting tracking of mail piece shipment and delivery.

SUMMARY OF THE INVENTION

Prior to shipping/mailing a particular parcel, or mail piece (alternatively, generally referred herein as an "item"), exemplary embodiments of the present invention would determine projected carrier-specific, delivery-service-specific routes, and associated projected delivery dates, times and rates to ship, or mail, as the case may be, a particular item, from a particular origin to a particular destination. Exemplary embodiments of the present invention would determine exemplary projected routes, delivery dates, times and rates for multiple carriers and multiple delivery services/methods. Exemplary embodiments would generate and provide an exemplary interactive graphic comparison mapping of the exemplary projected carrier-specific, delivery-service-specific routes, and associated projected delivery dates, times and rates. An exemplary interactive graphic comparison mapping would interactively facilitate a user fine-tuning and/or filtering carriers and delivery services/methods, so that a given mapping would compare only those carriers and delivery services/methods in which the user indicated interest.

Once a user had selected a particular carrier and delivery service/method for shipping/mailing and delivery of an item, exemplary embodiments of the present invention would generate, or would otherwise access, a carrier-specific identifier for the particular item, and would incorporate or otherwise associate the carrier-specific identifier for the particular item with carrier-specific shipping indicia. Exemplary embodiments of the present invention would generate and provide an exemplary interactive graphic mapping of the projected carrier-specific, delivery-service-specific route, and associated projected delivery date, time and rate for the selected carrier and delivery service/method. Exemplary embodiments of the present invention would then track shipping/mailing progress and delivery status of the item according to carrier-provided shipping/mailing progress and delivery status "events," such as, for example, carrier-provided item scanning events. Alternatively, exemplary embodiments would generate and provide exemplary interactive graphic "tracking" for an item, even in the absence of actual scan data for the item, such as, for example, based on, in whole or in part, historical tracking data for similar items, such as for items sent using the same or similar carrier and using the same or similar delivery service (e.g., Express, Overnight, First Class, etc.) from the same or nearby origin to the same or nearby destination. Exemplary embodiments of the present invention would update the interactive graphic mapping for the item according to actual tracking events and/or based on historical data and/or as a function of time from item pickup.

In some exemplary embodiments, a projected route may include a projection that different "legs" of a projected delivery path may be facilitated using different respective carriers. For example, a first leg of a delivery may be facilitated using an exemplary Carrier A; a second leg of a delivery may be facilitated using an exemplary Carrier B; etc.; and a final leg of a delivery may be facilitated using an exemplary Carrier X. Such an exemplary embodiment would receive tracking event data, such as scan event data, and/or historical information, whether in non-standardized, carrier-specific formats or in standardized formats; the exemplary embodiment would standardize, or otherwise interpret, non-standardized formats, of tracking and/or historical event data.

Exemplary embodiments of the present invention would generate a link, such as a hypertext link, or a plain text link, that a user could email to others or could post to, for example, a social networking website; an exemplary link would be a link to a webpage that displays/provides a depiction of the interactive graphic mapping of the projected carrier-specific, delivery-specific route, with status updates showing "to-date/time" progress on the route; the interactive graphic mapping of the projected carrier-specific, delivery-specific route would be updated as appropriate to reflect routing changes according to actual "events," such as scan events for the identifier associated with the item.

An exemplary interactive graphic mapping of a projected carrier-specific, delivery-specific route for an item would facilitate user interactivity to obtain details regarding tracking status, to resolve certain types of shipping/delivery issues (e.g., payment to resolve insufficient funds, change delivery instructions (e.g., change "require signature" to "leave without signature"), etc.) and/or, to apply for guarantee-delivery-failure refunds or adjustments. For example, some exemplary embodiments would provide a proactive package loss/issue alert if no tracking event data is received for a particular item within a certain amount of time (e.g., based on the particular carrier and delivery service, as a function of time from package drop-off and/or pickup) and would facilitate user-interactivity with the relevant carrier to arrange for a replacement delivery, refunds, and/or other appropriate actions.

Further, some exemplary embodiments would provide an interactive interface for, for example, a sending user, to associate video and/or audio information with an item being shipped/mailed. For example, some exemplary embodiments would provide an interactive user interface that would facilitate a sending user saving a voice message in an association with the item; the exemplary embodiment would respond to a user (shipping or receiving) clicking on the interactive graphic tracking mapping for the particular item by playing the audio and/or video message.

Some exemplary embodiments would also facilitate voice command tracking. For example, for a particular graphic tracking mapping for a particular item, a user could, e.g., click a particular mail facility depicted on the graphic mapping, or a portion of a graphic tracking mapping, and verbally ask a question, such as, regarding the status of the item; the exemplary embodiment, would respond with visual and/or verbal/audio tracking information.

BRIEF DESCRIPTION OF THE DRAWINGS

These and other features of the present invention are more fully set forth in the following description of exemplary embodiments of the invention. The description is presented with reference to the accompanying drawings in which:

FIGS. 1, 2 and 4 are graphic representations of various states of an exemplary item shipping specifications input and multi-carrier, multi-delivery-service comparison mapping screen in an exemplary embodiment of the present invention;

FIGS. 5A and 5B are graphic representations of various states of an exemplary interactive carrier and delivery service selection interface in an alternative exemplary embodiment of the present invention;

DETAILED DESCRIPTION OF THE INVENTION

Pre-Shipping Comparison

Figure 2:
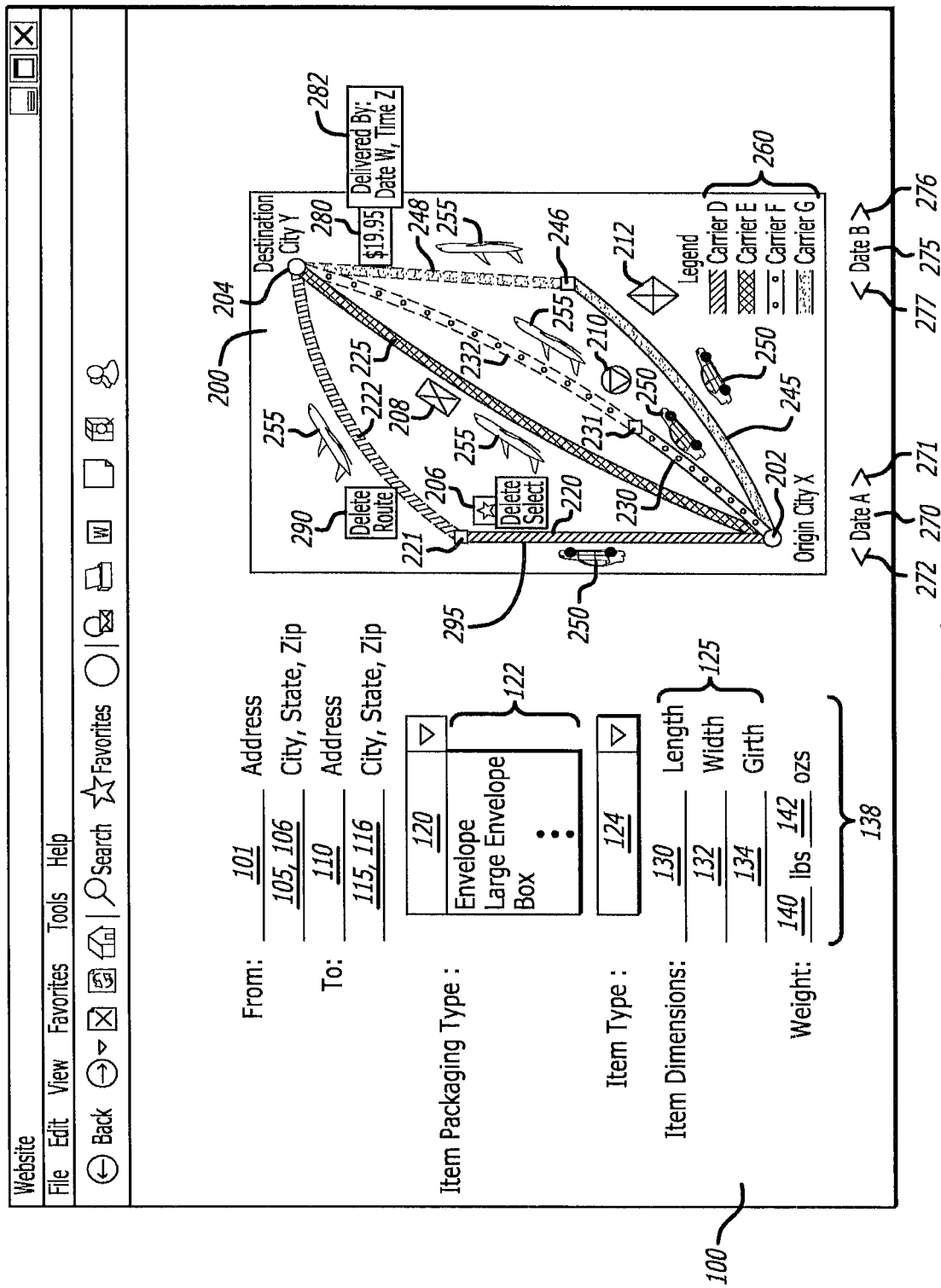

Various exemplary embodiments of the present invention would be possible. Some exemplary embodiments could be implemented by a single carrier for use by that carrier's shipping users. Some exemplary embodiments could be implemented by a single carrier for use by that carrier's management and/or that carrier's shipping users. Other exemplary embodiments could be implemented by a service provider to allow users of that service provider to select one carrier of a plurality of carriers supported by the service provider, and one delivery service offered by the selected carrier, to ship/mail an item.

Yet other exemplary embodiments could be implemented, such as, for example, by a service provider, to allow users of that service provider to select a combination of carriers and/or of delivery services, to ship/mail an item; in some circumstances, product providers, e.g., online retailers, manufacturers, or other product providers, may act as their own carrier for, as an illustrative example, a particular leg of a delivery, or for more than one legs/segments of a delivery, of an item (or of items, as the case may be).

In exemplary embodiments that facilitate projections and tracking for multiple carriers, transfers of an item from one carrier to another would be tracked and graphically depicted on an exemplary interactive graphic tracking mapping, as further described below.

In an exemplary embodiment offered, for example, by a service provider that supports shipment by any one of multiple carriers, the exemplary embodiment would determine projected routes (including projected transport methods and route portions (or "legs"), delivery dates, times and rates for multiple carriers and multiple delivery services/methods for shipping a particular item from a particular origin to a particular destination as identified by a user. In doing so, exemplary embodiments would determine which of the multiple carriers and the carriers' respective delivery services/methods would be available (i.e., would provide shipping services) for shipping the particular item from the particular origin to the particular destination according to each carrier's and each carrier's delivery service's rules and according to information about the particular item as specified by the user. Exemplary embodiments would determine projected routes (including projected transport methods and route portions (or "legs"), delivery dates, times and rates for those carriers and the carriers' respective delivery services/methods that the exemplary embodiment determined would be available for shipping the particular item from the particular origin to the particular destination; for any carrier, or for any delivery service for a particular carrier, that would not be available (i.e., would not provide shipping services) for shipping the particular item from the particular origin to the particular destination, exemplary embodiments would not determine projected routes, delivery dates, times or rates.

Exemplary embodiments would generate and provide an interactive graphic comparison mapping of the exemplary projected carrier-specific, delivery-service-specific routes, and associated projected delivery dates, times and rates for shipping a particular item from the particular origin to the particular destination; exemplary embodiments would not generate or depict on an interactive graphic mapping any projected route, or any projected delivery dates, times or rates, for any carrier, or for any delivery service for a particular carrier, that would not be available (i.e., would not provide shipping services) for shipping the particular item from the particular origin to the particular destination according to the relevant carrier's and carrier's delivery service's rules, in view of information regarding the particular item as specified by the user. An exemplary interactive graphic comparison mapping would interactively facilitate a user obtaining additional details regarding mapped routes. An exemplary interactive graphic comparison mapping would interactively facilitate a user fine-tuning and/or filtering carriers and delivery services/methods, so that a given mapping would compare only those carriers and delivery services/methods in which the user indicated interest.

Prior to shipping/mailing a particular parcel, or mail piece (alternatively, generally referred herein as an "item"), exemplary embodiments of the present invention would determine projected carrier-specific, delivery-service-specific routes, and associated projected delivery dates, times and rates to ship, or mail, as the case may be, a particular item, from a particular origin to a particular destination.

The present invention is not limited to destinations within the United States. Rather, exemplary embodiments would facilitate visual route projections and tracking to destinations involving any combination of U.S. and foreign locations.

The present invention is not limited to implementation regarding mailing and/or shipping items using a single carrier for an entire delivery path for an item. Rather, the present invention would apply equally to circumstances where multiple carriers and/or delivery services cooperate to progress an item along a delivery path from an origin location to a destination location. For example, in some exemplary embodiments, a projected route may include a projection that different "legs" of a projected delivery path may be facilitated using different respective carriers. For example, a first leg of a delivery may be facilitated using an exemplary Carrier A; a second leg of a delivery may be facilitated using an exemplary Carrier B; etc.; and a final leg of a delivery may be facilitated using an exemplary Carrier X. In such an exemplary embodiment, carrier rules may identify, for example, physical territories, or other types of carrier work segmentation, that would indicate a particular carrier for a particular delivery path "leg" and that would indicate another particular carder for another particular delivery path "leg". Exemplary "projection" mappings would graphically depict the projected path and the projected carrier/delivery service for each "leg" of the projected path; a consolidated "rate" and projected delivery data and time would be presented.

Further, the present invention is not limited to tracking delivery to individual residence or business destination addresses. Rather, exemplary embodiments would facilitate interactive graphic tracking mapping (and including mapping of projected routes, dates, times and rates) to alternative types of destinations, such as, for example, recipient drop boxes (such as secure drop boxes accessible by certain entities and/or recipients) and destination "lockers."

An exemplary recipient drop box may be, for example, a secured receptacle, such as a large box, in a particular location, such as, in front of a business. An exemplary recipient drop box could provide drop-delivery access to one or more carriers; it could provide for secure pick-up access by, for example, an access code, such as could be input using a key pad entry, or with a special access card, or the like.

An exemplary destination "locker" may be a location, such as at a retail establishment, a train station, an airport, or other accessible location. In some embodiments, a destination "locker" may be secured from public entry, such as with a combination lock, which may be a physical lock, or an electronically-controlled "lock". In some exemplary embodiments, for an item that is to be delivered to a destination "locker", a shipping user would input an identification of the destination "locker" (e.g., an establishment name and/or address and/or a unit identifier for the particular destination "locker", and an access code for access to the particular destination "locker"; the exemplary embodiment would notify the recipient of the destination "locker" location and identity and access code in order for the recipient to gain entry to the destination "locker" once the item has been delivered.

In some exemplary embodiments, exemplary destination "locker" access codes may comprise, by way of non-limiting, illustrative examples: a series of alphanumeric characters and setting instructions (e.g., turn to the left, dial to the right, etc.); a barcode that can be scanned into, e.g., an intelligent phone and then transmitted from the intelligent phone to the destination "locker" for access; an item-specific "App" (application) that can be downloaded to, e.g., an intelligent phone, and then transmitted from the intelligent phone to the designated destination "locker" for access; other types of access technologies whether now known or in the future discovered; and any combination thereof. In an embodiment when, for example, an access "App" is needed to access a particular destination "locker", the exemplary embodiment would present an icon for the access "app" in an exemplary interactive graphic tracking mapping; the exemplary the recipient user.

Figure 1:
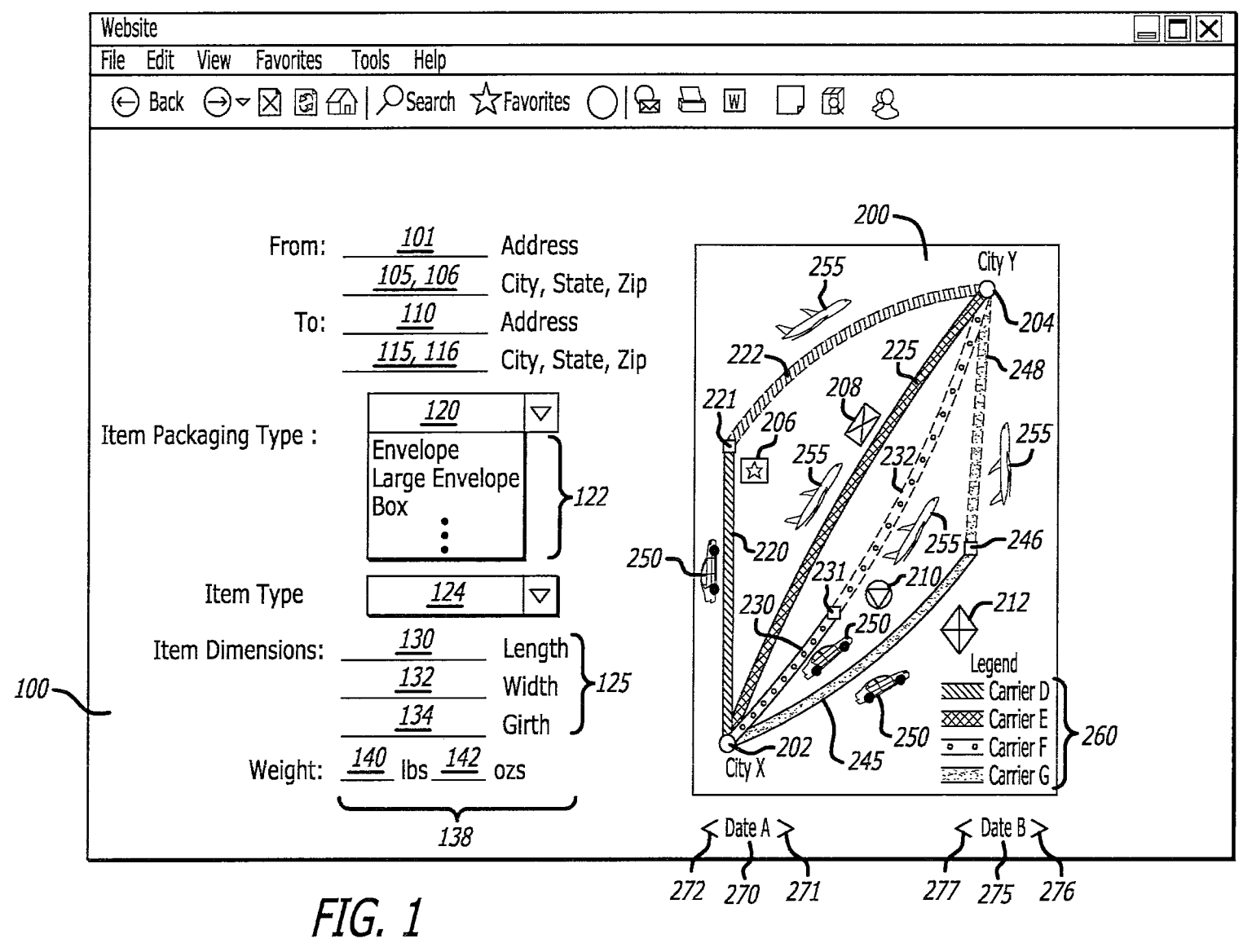

In some exemplary embodiments, such projected routes, dates, times and rates would be done automatically, such as in response to a user's input of item shipping specifications as illustratively depicted in FIG. 1. As illustratively depicted in FIG. 1, exemplary item shipping specifications would comprise, for example, user input of origin (e.g., an origin address 101, an origin city/state name 105, an origin zip code 106, and/or the like), destination (e.g., a destination address 110, a destination city/state name 115, a destination zip code 116, and/or the like), item packaging type 120 (e.g., an exemplary drop down menu 122 showing exemplary item type choices such as, e.g., envelope, large envelope, box), item content type 124 (that would, for example, comprise an exemplary drop down menu that, if expanded, would show, e.g., exemplary content types such as printed matter, DVD, magazines, books, clothing, shoes, technology, etc.), item dimensions 125 (e.g., showing exemplary input fields for entering Item Length 130, Item Width 132 and Item Girth 134), item weight 138 (e.g., showing exemplary input fields for entering Item Weight in pounds 140 and ounces 142), and the like. In other exemplary embodiments (see, e.g., FIG. 4), projected routes, dates, times and rates would be determined and displayed in response to a user's specific request for a comparison of carriers and/or delivery services.

FIG. 1 provides an exemplary graphic depiction of an exemplary interactive graphic user interface 100 that facilitates a user's input of an item's shipping specifications and in response to the user's input, automatically determines exemplary projected carrier-specific, delivery-service-specific routes, and associated projected delivery dates, times and rates to ship, or mail, as the case may be, the particular item, from the particular origin to the particular destination. Exemplary interactive graphic user interface 100 and the other exemplary interactive graphic user interface screens depicted and/or described herein may be displayed, e.g., as a web page through a user's computer's (or intelligent telephone/computer) browser software, or through client software (or an "App") on a user's computer, or otherwise displayed to a user device whether using methods now known or in the future discovered.

Figure 3:
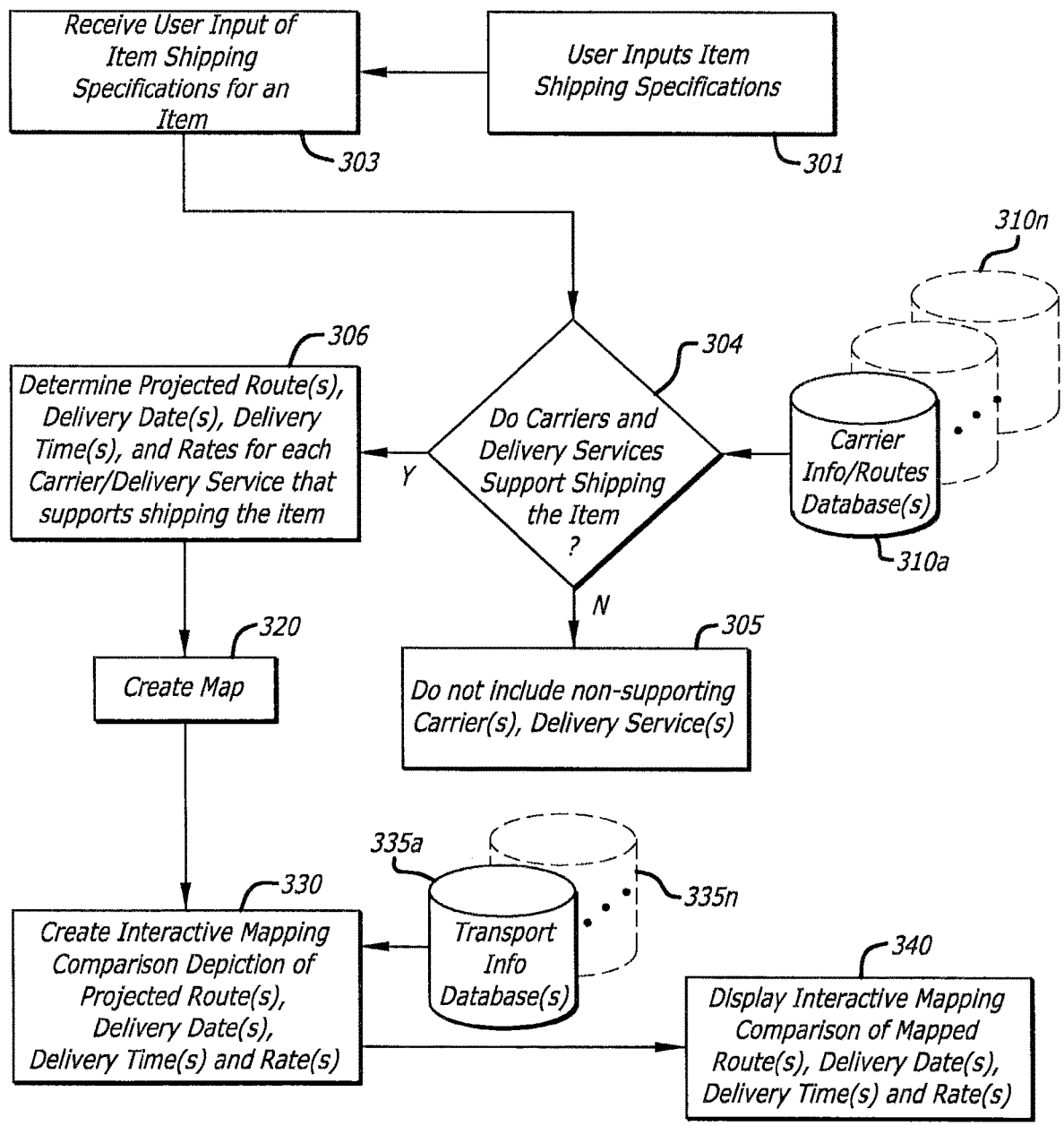
FIG. 3 depicts exemplary high level log functions in an exemplary high level logic flow for an exemplary embodiment's creation of an exemplary interactive graphic mapping comparison in an exemplary embodiment of the present invention.

FIG. 3 depicts exemplary high level logic functions in an exemplary high level logic flow for an exemplary embodiment's creation of an exemplary interactive graphic mapping comparison. As depicted in FIG. 3, in an exemplary embodiment, a user would input item shipping specifications 301 (as described above with respect to FIG. 1 element numbers 101-142). The exemplary embodiment would receive the user input of item shipping specifications 303.

In response to the user's input of the item's shipping specifications, the exemplary embodiment depicted in FIG. 1 would automatically access (see FIG. 3) one or more Carrier Information/Rules Data Bases 310a-310n comprising Carrier-specific Carrier Routing, Networking, Shipping and related rules and information. In one exemplary embodiment, a single, centralized Carrier Information/Rules Data Base, e.g., 310a, would be provided that would contain all of the information and rules for all of the carriers and delivery services supported by an exemplary service provider. In another exemplary embodiment, the exemplary system depicted in FIG. 3 would access distributed carrier-maintained Carrier Information/Rules Data Bases 310a-310n, each of which would, for example, contain information and rules for the particular carrier, and/or for the particular carrier and for a particular delivery service/method.

Based on the carrier-specific, delivery-service-specific rules and information, the exemplary embodiment (e.g., a computer system, such as an Internet-based system comprising, for example, one or more computer devices (such as, for example, server computer devices, programmed to, whether alone, or in conjunction with other computer devices), or alternatively, an application (an "App") comprising software executing on a user's intelligent phone/computer or other user computer device), would determine 304 which of the carriers and the carriers' respective delivery services/methods would be available (i.e., would provide shipping services) for shipping the particular item according to the user-specified Shipping Specifications, according to each carrier's and each carrier's delivery service's rules 310a . . . 310n. For those carriers/delivery services that did not support shipping the item (the "N" path from test process 304), the exemplary embodiment would not include those carriers or delivery services 305 in the exemplary embodiment's determination (306) of projected routes, dates, times and rates. For those carriers and delivery services that the exemplary embodiment determined would provide shipping services for shipping the particular item ("Y" path from test process 304), the exemplary embodiment would automatically determine 306 exemplary projected carrier-specific, delivery-service-specific routes, including each portion (or "leg") of a route and route-specific/leg-specific transport methods (e.g. trucking, train, airplane, etc.). Based on the carrier-specific, delivery-service-specific rules and information, the exemplary embodiment would further automatically determine 306 associated projected delivery dates, times and rates to ship, or mail, as the case may be, the particular item, from the particular origin to the particular destination.

The exemplary embodiment depicted in FIG. 3 would create an exemplary map 320. The exemplary embodiment depicted in FIG. 3 would access transport information data base(s) 335a (-335n) to obtain information regarding the projected routes, including, but not limited to, weather information along the projected routes, route information (such as, for example, blocked highways, damaged train routes, and the like) and with respect to carrier mailing/shipping processing facilities.

The exemplary embodiment depicted in FIG. 3 would analyze information regarding the projected routes obtained from the transport information data base(s) 335a (-335n), and would, in some circumstances, modify elements of one or more projected routes. For example, if the exemplary embodiment determined, based on a particular carrier's rules, and in view of available transport information, that a particular carrier's primary or preferred mail processing facility between a particular origin and a particular destination was experiencing substantial delay, such as, for example, due to inclement weather, or some other circumstance, the exemplary embodiment would project an alternative route for shipping/mailing the particular item, according to carrier rules and information relevant to redirecting deliveries in such circumstances.

Further, using information regarding the projected routes obtained from the transport information data base(s) 335a (-335n), and from the carriers' respective rules, the exemplary embodiment depicted in FIG. 3 would create an exemplary interactive mapping comparison depiction 330 of projected route(s), delivery date(s), delivery time(s) and rate(s). The exemplary embodiment depicted in FIG. 3 would then display 340, or cause a display of, the exemplary interactive mapping comparison of the projected mapped route(s), delivery date(s), delivery time(s) and rate(s). As will be explained in more detail below, the exemplary interactive mapping comparison display 340 would comprise an interactive depiction of the projected mapped route(s), delivery date(s), delivery time(s) and rate(s), and would comprise such additional features as interactive elements for displaying additional detail, removing elements from the display, modifying the relevant dates, and for alerting the user regarding transport method issues and/or considerations.

Returning with reference to FIG. 1, the exemplary embodiment depicted in FIG. 1 would automatically display an exemplary interactive comparison mapping 200 of various exemplary projected carrier and delivery service routes (e.g., exemplary route 220/221/222 for exemplary Carrier D/Delivery Service N depicted by exemplary Carrier D/Delivery Service N icon 206; exemplary route 225 for exemplary Carrier E/Delivery Service O depicted by exemplary Carrier E/Delivery Service O icon 208; exemplary route 230/231/232 for exemplary Carrier F/Delivery Service P depicted by exemplary Carrier F/Delivery Service P icon 210; and exemplary route 245/246/248 for exemplary Carrier G/Delivery Service Q depicted by exemplary Carrier G/Delivery Service Q icon 212), delivery dates, times and rates.

It will be understood by someone with ordinary skill in the art that there would be various ways to visually display an interactive comparison mapping of various exemplary projected carrier and delivery service routes. The exemplary embodiment depicted in FIG. 1 depicts the various exemplary projected carrier and delivery service routes as being shown with carrier-specific/delivery-service-specific patterns. For example, exemplary route 220/221/222 for exemplary Carrier D/Delivery Service N is depicted with an exemplary first (slanted hash line) pattern; exemplary route 225 for exemplary Carrier E/Delivery Service O is depicted with an exemplary second (wavy-line) pattern; exemplary route 230/231/232 for exemplary Carrier F/Delivery Service P is depicted by an exemplary third (circle) pattern; and exemplary route 245/246/248 for exemplary Carrier G/Delivery Service Q is depicted with an exemplary fourth (triangle) pattern. An exemplary pattern legend 260 would be provided to guide the user. Alternatively, various carrier-specific, delivery-service-specific colors (with an exemplary color legend (not shown)) could be used for each carrier and delivery service. Further, a particular color could be used to designate a particular carrier; different patterns could be used to designate a particular delivery service level; an appropriate legend (not shown) would be provided to guide the user.

Exemplary interactive comparison mapping 200 depicts exemplary carrier-specific processing facilities 221 (for exemplary Carrier D), 231 (for exemplary Carrier F), and 246 (for exemplary Carrier G). Exemplary carrier-specific processing facilities, such as 221, 231 and 246, may be airport hubs, or other processing facilities. Exemplary carrier-specific transport methods are depicted, e.g., by showing exemplary transport method icons such as, for example, an exemplary trucking icon 250 and an exemplary airline icon 255. Other exemplary carrier-specific transport method icons would be used to depict, for example, train, ship or other transport methods. Information and rules for projecting the route(s), the transport method(s), the location(s) and type(s) of processing facilities, as well as for projecting delivery dates and times and rates, would be determined according to information obtained from Carrier Information/Rules Data Bases 310a (-310n) as depicted in FIG. 3.

With reference to FIG. 1, exemplary interactive comparison mapping display 200 depicts, based on an exemplary Anticipated Ship Date A 270, by exemplary Date B 275, that exemplary projected route 225 for exemplary Carrier E/Delivery Service O would be completed—in particular, exemplary projected route 225 is depicted with solid outline lines from exemplary Origin City X 202 all the way to exemplary Destination City Y 204. However, by exemplary Date B 275, exemplary route portion 220 of exemplary projected route 220/221/222 for exemplary Carrier D/Delivery Service N is depicted as having been completed, by depicting with solid outline lines from exemplary Origin City X 202 to exemplary Carrier D/Delivery Service N processing hub 221; exemplary route portion 222 of exemplary projected route 220/221/222 for exemplary Carrier D/Delivery Service N is depicted with broken outline lines, illustratively depicting that exemplary route portion 222 has not been completed by exemplary Projected Delivery Date B 275.

An exemplary embodiment that supported a number of carriers and their respective delivery services could result in a dense display of comparison information. Rather than display every piece of information on an exemplary interactive mapping comparison display, an exemplary embodiment would provide interactivity such that the user could hover the user's cursor over, or click, various elements of the interactive mapping comparison display, which would cause an insert window display that would provide additional details regarding the relevant element. For example, an exemplary embodiment would provide interactivity such that the user could hover the user's cursor over, or click, a particular carrier's/delivery service's route, which would cause the exemplary embodiment to display additional details about the particular route, e.g., 280 (see FIG. 2; depicting an exemplary display of an exemplary rate) and (see FIG. 2; depicting an exemplary display of an exemplary projected delivery date and time).

Exemplary embodiments of the present invention would consider the item's shipping specifications as had been input by the user, such as in exemplary fields illustratively depicted in FIG. 1, element numbers 101-142; the exemplary embodiments would determine whether or not the various supported carriers and delivery service methods could be used to ship and deliver a particular item according to the item's shipping specifications; the generated comparison mapping would only include carriers and delivery service methods that would support shipping and delivery of the particular item according to the item's shipping specifications. For example, if a user had selected an Item Type (input field element number 124) of clothing, the exemplary embodiment would analyze the item shipping specifications and the various carrier's rules and information, and, for example, would not generate any projected route for the delivery service method of "Media Mail" for the USPS. As another example, some carriers and/or delivery services, might have weight limitations for particular services. For example, if a user had input an Item Weight of, for example, 4 pounds and 4 ounces in weight input field numbers 140 and 142, then the exemplary embodiment would analyze the item shipping specifications and the carrier rules and information and would not generate any projected rate for the item for First Class Mail by the USPS.

The exemplary embodiment would provide various interactive tools with which the user could revise/refine the comparison. For example, the exemplary embodiment would provide interactivity of the displayed routes such that a user could place the user's cursor over a particular route, e.g., exemplary route 220/221/222, and right click, which would display an exemplary Delete Route 290 (see FIG. 2) option, which, if clicked, would delete that particular route (220/221/222) from the exemplary display.

Another example of an interactive tool would be that the exemplary embodiment would provide interactivity of the carriers such that a user could place the user's cursor over a particular carrier icon, e.g., over exemplary carrier icon 206, and right click, which would display an exemplary list of Carrier options 295 (see FIG. 2), which would include, for example, a "Delete" option, which, if clicked, would delete that particular carrier (206) and, e.g., all routes for that carrier (206), from the exemplary display.

As a further example of interactivity, the exemplary interactive mapping comparison display would further provide interactivity of the carriers such that a user could place the user's cursor over a particular carrier icon, e.g., over exemplary carrier icon 206, and right click, which would display the aforementioned exemplary list of Carrier options 295, which would include, for example, a "Select" option, which, if clicked, would select that particular carrier and the delivery service depicted in the projected route nearest the selected carrier icon (exemplary projected route 220/221/222) for shipping/delivery of the item—the selection of which would cause the exemplary embodiment to obtain payment from the user (or an authorization for payment) for the selected carrier and the selected delivery service; the exemplary embodiment would then generate (as described in more detail below), or would otherwise access, a carrier-specific identifier, for the particular item; the exemplary embodiment would generate carrier-specific shipping indicia and would incorporate or otherwise associate the carrier-specific identifier for the particular item with the carrier-specific shipping indicia; the user would then print labels comprising the carrier-specific shipping indicia (and if separately generated, the carrier-specific identifier) and would affix the printed label(s) to the item.

Figure 5B:
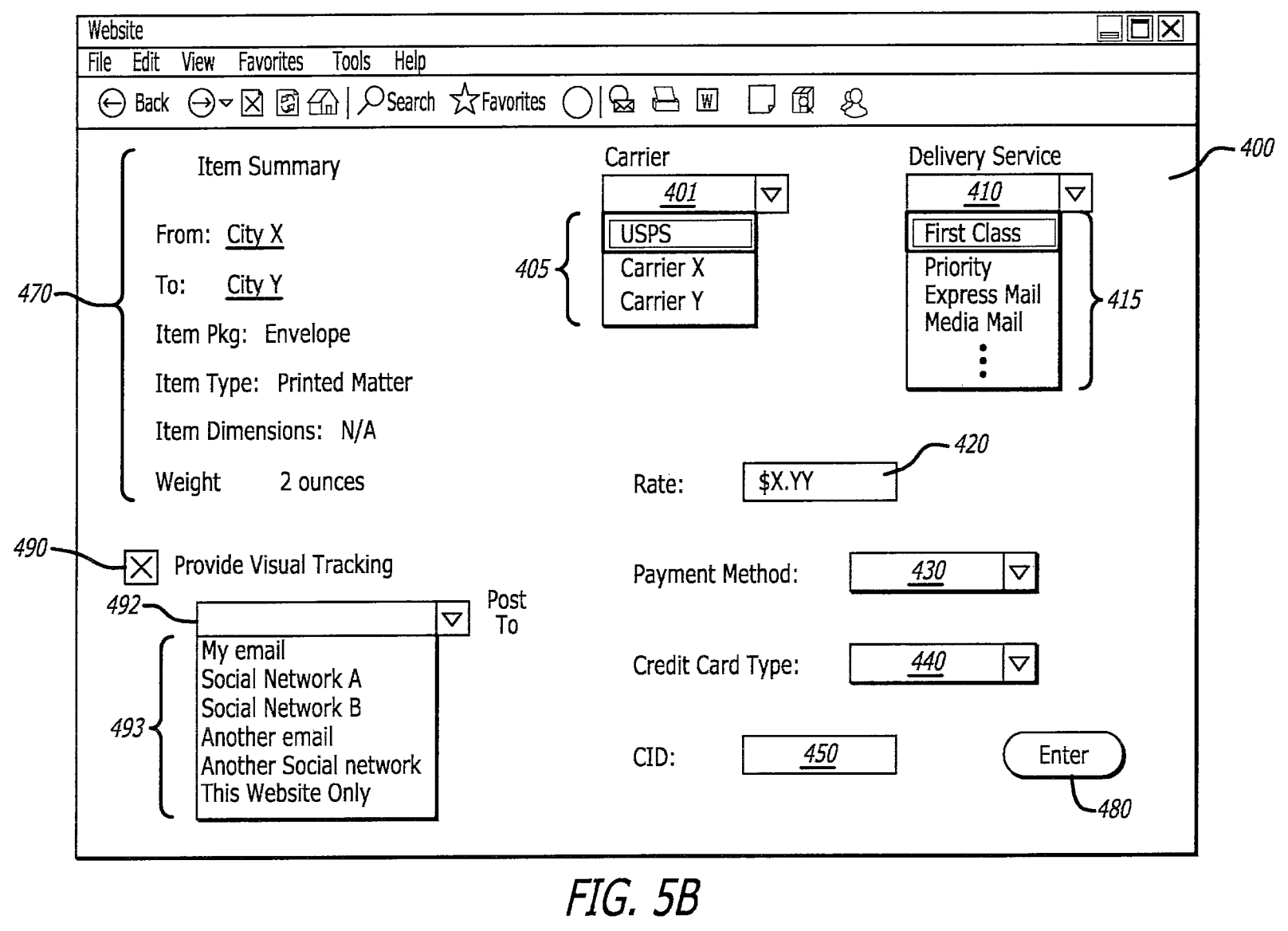

It will be understood by someone with ordinary skill in the art that there would be various ways in which to present to a user, carrier and delivery service selection and payment. For example, in an alternative embodiment, instead of, or in addition to, the approach described above for allowing interactive selection of a carrier and delivery service directly from the exemplary interactive comparison mapping, a separate screen, such as illustratively depicted in FIGS. 5A and 5B, could be displayed. As depicted in FIG. 5A, a summary 470 of the item's shipping specifications could be provided with a carrier selection input field 401; an associated carrier drop-down menu 405 would provide a list of supported carriers. In some exemplary embodiments, the carrier drop-down menu 405 would only list carriers that would support shipping of the item according to the particular item's shipping specifications and according to the carrier's rules; in other exemplary embodiments, all carriers supported by the system would be displayed in the carrier drop down menu 405. As depicted in FIG. 5B, once a carrier has been selected, then a drop-down menu of available delivery service methods 415 would be provided for a Delivery Service selection input field 410. In some exemplary embodiments, the delivery service drop-down menu 415 would only list delivery services by the selected carrier that would support shipping of the item according to the particular item's shipping specifications and according to the carrier's and delivery service's rules; in other exemplary embodiments, all delivery services supported by the selected carrier would be listed.

As depicted by FIGS. 5A and 5B, once a user had selected a carrier 401 and delivery service 410, the rate 420 would be displayed and the user would need to input a Payment Method 430 (and if appropriate, a credit card type 440 and CID 450. Once the user had input the required payment information, the user could click the "Enter" button 480, which would cause the exemplary embodiment to generate the carrier-specific, delivery-service-specific shipping/mailing indicia, including tracking indicia (which may be separate from, or incorporated into, the carrier-specific, delivery-service-specific shipping/mailing indicia), and generate label(s) comprising a representation of the generated carrier-specific, delivery-service-specific shipping/mailing indicia and tracking indicia.

Figure 4:
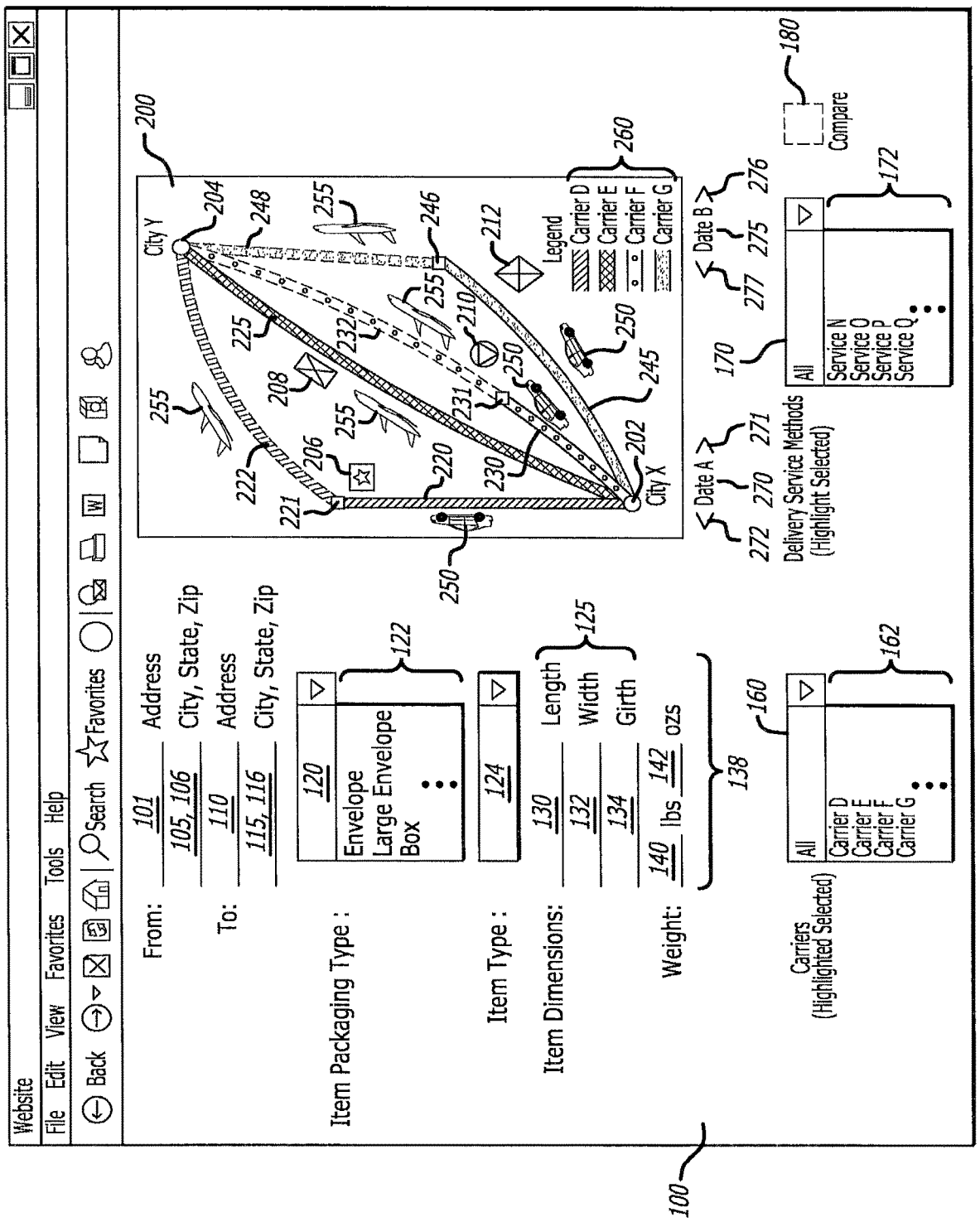

As depicted in FIGS. 1, 2 and 4, another example of an interactive tool would be that the exemplary embodiment would provide interactivity to modify the Anticipated Shipping Date 270 (using exemplary future button 271 or exemplary backward button 272) and/or the Projected Delivery Date 275 (using exemplary future button 276 or exemplary backward button 277).

As further information for the user to consider, the exemplary embodiment would provide, either directly on an exemplary display, or through a user-selected detail insert window, or through other display methods, alerts regarding processing and/or transport for each carrier and that carrier's delivery services (as was depicted in FIG. 3 as being obtained from one or more Transport Information Data Bases (335a (-335n)). The exemplary embodiment would provide weather and other types of software interfaces, that would, for example, monitor and query weather and other types of database(s) and information to determine if weather and/or other conditions relevant to carrier processing facilities necessitated weather or other condition alerts, if appropriate, for the relevant carrier processing facilities. For example, if a particular carrier's processing facility, e.g., carrier processing facility 221, happened to be an airport, the exemplary embodiment would monitor weather and traffic control information for that airport; if the exemplary embodiment determined, for example, that the airport had been snowed in and all flights in and out had been cancelled, the exemplary embodiment would, for example, highlight (not shown), or cause the carrier processing facility icon 221 to visually flash (not shown) to alert the viewing shipping user that alert circumstances exist regarding that processing facility; a user placing the user's cursor over the highlighted or flashing or otherwise alerting carrier processing facility icon 221 would cause a display of an insert window that would provide details regarding any alert issues for the relevant processing facility. Or, even in an embodiment that did not highlight or signal an alert for a particular transport element, a user placing the user's cursor over a transport element would cause a display of an insert window that would provide details regarding any that particular transport element, including any alert issues for the particular transport element.

As another example of interactivity of the exemplary interactive comparison mapping display 200, if the exemplary projected route between an exemplary origin city and an exemplary destination city would, according to a particular carrier's/delivery service's rules and information, likely be done by a particular transport method (e.g., truck/highway, or train, or airplane), the exemplary embodiment would provide an alert and, or even absent an alert, additional details regarding, the relevant transport element, e.g., the projected highway route, train route or air route.

In an alternative exemplary embodiments depicted in FIG. 4, the user would be provided with interactive input fields for specifying carriers 160 (through, for example, an exemplary pull-down menu 162 of supported carriers) and delivery service methods 170 (through, for example an exemplary pull-down menu 172 of delivery services supported by the supported carriers) for which the user would want to compare projected routes, dates, times and rates. The alternative exemplary embodiment would determine and display in response to a user's specification of interest in certain carriers and delivery services, or in some exemplary embodiments in response to the user's request for a comparison of carriers and/or delivery services (using, e.g., optional comparison request indicator input field 180).

Post-Shipping-Selection Tracking Enablement

Based on a visual comparison of the projected routes, a user could then select a particular carrier and delivery service/method, or in some exemplary embodiments, a combination of carriers/delivery service/methods for various legs/portions of a projected delivery path.

Once a user had selected a particular carrier and delivery service/method (or in some exemplary embodiments, a combination of carriers/delivery service/methods for various legs/portions of a projected delivery path) for shipping/mailing and delivery of an item (and paid, or authorized payment, for the shipment), exemplary embodiments of the present invention would generate or to otherwise access, a carrier-specific identifier, for the particular item; the exemplary embodiment would generate carrier-specific shipping indicia and would incorporate or otherwise associate the carrier-specific identifier for the particular item with the carrier-specific shipping indicia; the user would then print labels comprising the carrier-specific shipping indicia (and if separately generated, the carrier-specific identifier) and would affix the printed label(s) to the item; exemplary embodiments would record information concerning the carrier-specific identifier and the carrier-specific shipping indicia and/or with other information regarding the item, including, for example, identification of the shipping user, and the shipping specifications/parameters (e.g., origin, destination, item type, etc.).

For example, in an exemplary embodiment of the present invention, if a user selected the USPS as a carrier for shipping a particular item, and if the user selected USPS Express Mail as the USPS delivery service/method for shipping the item, the exemplary embodiment would generate a USPS Express Mail Tracking identifier and would generate a USPS Express Mail Label for print rendering; the user would print the USPS Express Mail Label and would affix the Label to the item. The exemplary embodiment would record, such as in a computer-accessible memory, information regarding the shipping user, parcel and shipping specifications, and the USPS Express Mail Tracking identifier for the particular item.

Alternatively, if the user selected, for example, USPS First-Class Mail for mailing the item, an exemplary embodiment would generate an Intelligent Mail Barcode and USPS computer-based postage indicia for print rendering; the user would print the USPS computer-based postage indicia and the associated Intelligent Mail Barcode ("IMB") and would affix the postage indicia and the IMB to the item. The exemplary embodiment would record, such as in a computer-accessible memory, information regarding the shipping user, parcel and shipping specifications, and the IMB for the particular item.

The present invention is not limited to implementation regarding mailings using the USPS. Rather, the present invention may be used for private and/or governmental carriers alike. Some exemplary embodiments could be implemented to provide interactive projected route mapping comparisons for multiple carriers and multiple delivery services/methods offered by each of the multiple carriers. Other exemplary embodiments of the present invention could be implemented for a single carrier; exemplary single carrier embodiments would provide interactive projected route mapping comparisons for various delivery services by the single carrier.

Further, as previously mentioned above, the present invention is not limited to implementation regarding mailing and/or shipping items using a single carrier for an entire delivery path for an item. Rather, the present invention would apply equally to circumstances where multiple carriers and/or delivery services cooperate to progress an item along a delivery path from an origin location to a destination location. For example, in some exemplary embodiments, an item's delivery route may include different "legs" that are facilitated using different respective carriers. For example, a first leg of a delivery path of an item may be facilitated using an exemplary Carrier A; a second leg of the delivery path for the item may be facilitated using an exemplary Carrier B; etc.; and a final leg of the delivery path for the item may be facilitated using an exemplary Carrier X.

Such an exemplary multi-carrier-delivery-service-path embodiment would facilitate a user's selection of a particular delivery path that may represent a single carrier or multiple carriers; such an exemplary embodiment would facilitate the generation and printing of mailing/shipping indicia in accordance with a consortium of the carriers and delivery services specified by the selected path according to a database of carrier/delivery service consortium rules and rates; the exemplary embodiment would charge the relevant user's account for the appropriate amount of money for printing the consortium mailing/shipping indicia.

In an embodiment where a consortium of carriers and delivery services are selected to ship a particular item, the exemplary embodiment would, such as, for example, as part of the generation of the relevant consortium shipping/mailing indicia, generate an appropriate consortium "tracking" identifier. The generated consortium tracking identifier could be unique, or substantially unique (for some amount of time), within the exemplary embodiment, or for the relevant carrier/delivery service consortium. Actual scanning events provided by the relevant carrier(s)/delivery service(s) would include a representation of the relevant consortium tracking identifier.

Returning with reference to FIG. 1, as the exemplary user inputs a selection of a carrier and delivery service method, exemplary embodiments of the present invention would consider the item's shipping specifications as had been input by the user, such as in exemplary fields illustratively depicted in FIG. 1, element numbers 101-142; the exemplary embodiments would determine whether or not a particular selected carrier and/or a particular selected delivery service could be selected for a particular item according to the item's shipping specifications. For example, if a user had selected an Item Type (input field element number 124) of clothing, the exemplary embodiment would analyze the item shipping specifications and the selected carrier's rules and information, and, for example, would not allow the user to select a delivery service of "Media Mail" for the USPS. As another example, some carriers and/or delivery services, might have weight limitations for particular services. For example, if a user had input an Item Weight of, for example, 4 pounds and 4 ounces in weight input field numbers 140 and 142, then the exemplary embodiment would analyze the item shipping specifications and the carrier rules and information and would not allow the user to select First Class Mail by the USPS.

Visual Graphic Tracking

Once the user had selected a particular carrier and delivery service and had printed the relevant shipping/mailing indicia and any relevant additional labels, such as, for example, tracking label(s), exemplary embodiments of the present invention would generate and provide an interactive graphic mapping of the projected carrier-specific, delivery-service-specific route, depicting each route "leg" and relevant transport method (and if called for, such as in circumstance where a different carrier may be used for each different "leg" of a delivery path; relevant carrier) icons, and the associated projected delivery date, time and rate for the selected carrier and delivery service/method; exemplary embodiments of the present invention would then track shipping/mailing progress and delivery status of the item according to carrier-provided shipping/mailing progress and delivery status "events," such as, for example, carrier-provided item scanning events.

Some exemplary embodiments would automatically generate and provide interactive graphic mapping and tracking of the item once the user had printed the item's shipping/mailing indicia/label. In other exemplary embodiments, a user could expressly request the generation of interactive graphic mapping and tracking and the exemplary embodiment would respond to the request by generating and providing interactive graphic mapping and tracking of the item. For example, FIGS. 5A and 5B depict an exemplary visual tracking instruction input field 490.

Figure 6:
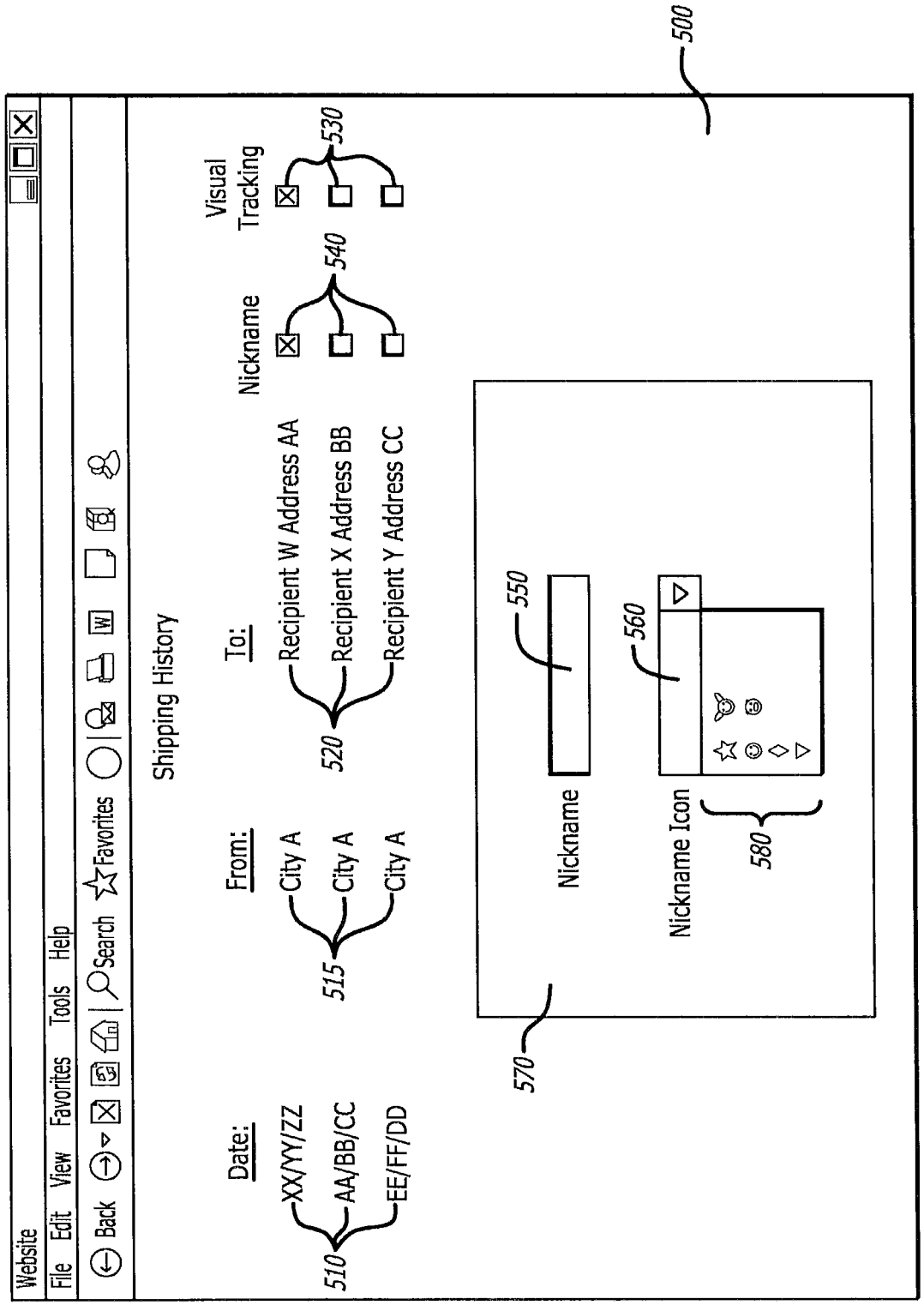
FIG. 6 is a graphic representation of an exemplary Shipping History screen in an exemplary embodiment of the present invention.

In some exemplary embodiments where visual tracking would automatically be provided, a user would be able, for example, to view a visual tracking map for the particular item on a web page associated with the user's shipping history of items shipped through a system provided by the exemplary embodiment. FIG. 6 depicts an exemplary Shipping History page 500 for items shipped by a particular user. For each item in the user's shipping history, for example, a shipping date 510, an origin (from) city/address 515, and a destination (to) recipient name/address 520 would be provided.

Figure 8:
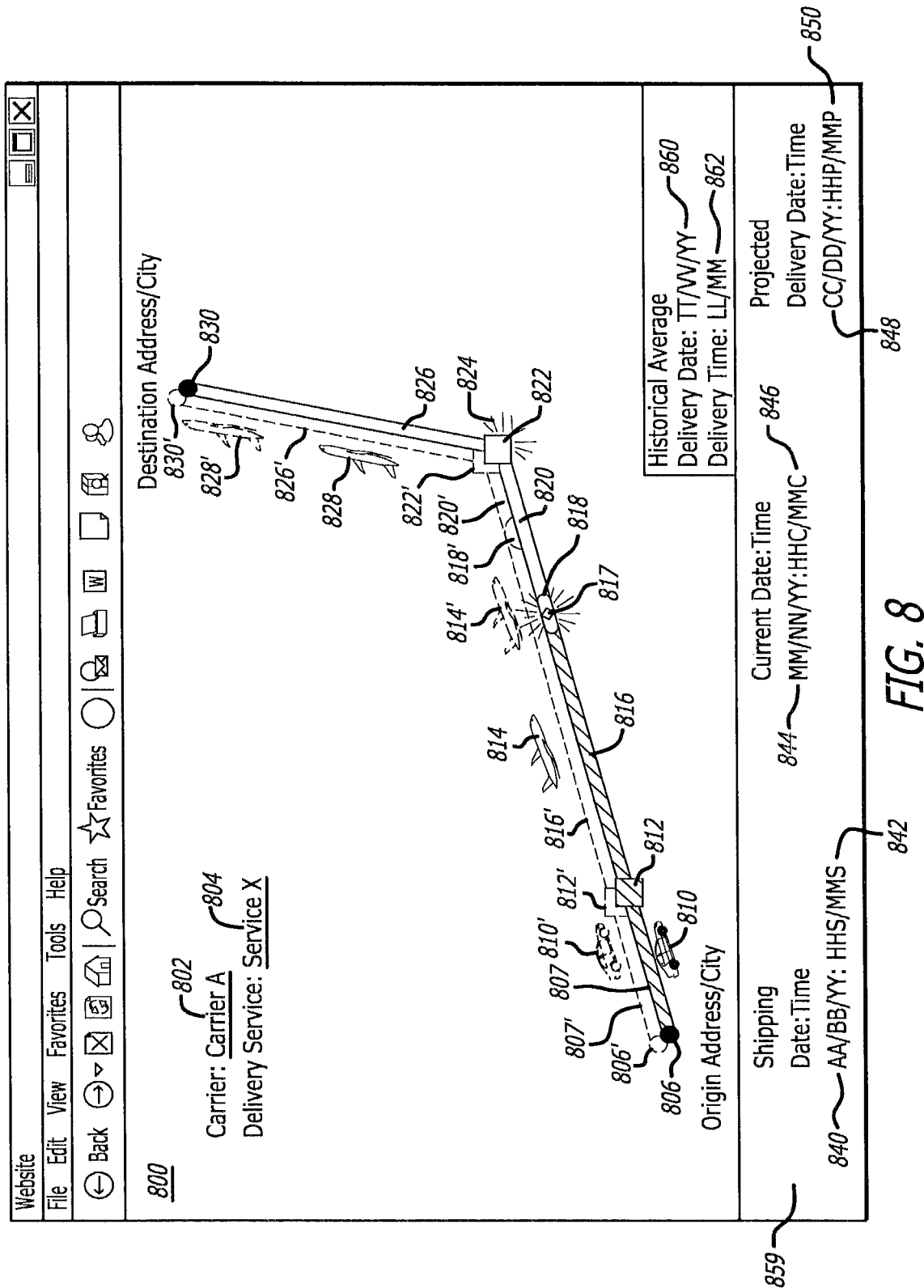
FIGS. 8-11 depict various states and options of an exemplary item-specific interactive visual tracking map in an exemplary embodiment of the present invention.

For each item depicted in the exemplary Shipping History depicted in FIG. 6, an exemplary item-specific visual tracking indicator field 530 would be provided. In some exemplary embodiments, a user would click the item-specific visual tracking indicator 530 for a particular item, and the exemplary embodiment would then depict, such as shown in FIG. 8, an exemplary visual tracking map 800 of that item's projected route and status. Other exemplary embodiments would facilitate a user clicking on a number of items in the user's shipping history, which would cause the exemplary embodiment to display a visual tracking map that would show projected routes for all of the selected packages.

As will be understood by someone with ordinary skill in the art, the exemplary Shipping History view illustratively depicted in FIG. 6 would not be limited to providing a particular user's shipping history. Rather, in an exemplary embodiment depicted for a particular carrier, a carrier shipping administrator could view shipping history according to one or more shipping criteria selection criteria (shipping user, origin city, destination city, mail processing facility, etc.). A carrier could potentially use such a shipping history view and the associated visual tracking indicator(s) (and/or, with an option, for example, to select all) to visually map the tracking status of various items meeting the carrier-input selection criteria and re-route, or arrange some alternative processing, as the need may be, to resolve some carrier-specific shipping issue. For example, if a particular processing facility was experiencing an issue affecting processing, such as severe inclement weather, a carrier could use an exemplary visual tracking embodiment to re-route items en route to the particular processing facility to another processing facility.

In the exemplary embodiment, where a user checks multiple items for visual tracking, a separate map, route and link/App could be created for each item; and/or one map and link/App could be created for all selected items, the routes for each item on the map being labeled with the corresponding item Nickname (as described further below; see element

550, FIG. 6); and/or, the shipping/mailing user may want to have a single map to check the location/status of multiple items but may want to post a separate item-specific map or link/App for individual items, e.g., to a social networking site. With separate maps/routes/links/Apps, the user could then tailor social network viewing "permissions" to the user's social networking groups, families, etc. for each item-specific map/route/link/App.

FIG. 6 depicts an exemplary "Nickname" field 540 which a user could check; checking the exemplary "Nickname" field would generate either a separate page or an insert window (as depicted by exemplary insert window 570) that would provide a Nickname input field 550 into which the user could enter a nickname for the particular item that would be displayed on the visual tracking map to be generated along with the projected route/status for the item. Exemplary insert window 570 would also provide an exemplary Nickname icon input field 560 with an associated Nickname icon drop-down menu 580 that would list various selectable graphic icons that, if selected by the user, would then be graphically associated with the projected route and tracking status for the associated item. The exemplary embodiment would store the Nickname and an indicator of the Nickname icon in an association with an identifier for the item, such as in an association with a tracking identifier for the item.

An exemplary Nickname might be a short phrase or a word to identify an item on a map, such as, for example, "Scott's Present" or "Jim's Docs." Or, as previously mentioned, the "Nickname" could be an icon selected by the shipping user to identify the item.

In some exemplary embodiments, an item Nickname could appear in a header title for map display; or the item Nickname could appear next to an icon on a map display, so that for a map showing multiple items, each item icon would have a Nickname displayed on it.

Further, some exemplary embodiments would facilitate voice command tracking. For example, a user could click on a mail facility or some portion of an interactive, graphic tracking mapping for a particular item and the exemplary embodiment would facilitate the user's input of a voice command, such as, by way of non-limiting example, a user's verbal question "What is the status for Nickname X?" The exemplary embodiment would translate the question into a system-standardized format and would respond with a verbal/audio and/or text display of an appropriate response, based on the information available.

In addition to being able to associate a Nickname with a particular item, some exemplary embodiments would provide an interactive interface for, for example, a sending user, to associate video and/or audio and/or textual information with an item being shipped/mailed. For example, some exemplary embodiments would provide an interactive user interface that would facilitate a sending user recording and saving a voice message (such as, by way of non-limiting example, a "Happy Birthday" or other greeting message) or a video (such as, by way of non-limiting example, a product demonstration video relevant to the item being sent), such as in an association with the item. For an item for which an audio or video message has been associated, the exemplary embodiment would, by way of non-limiting example, respond to a user (shipping or receiving) clicking on the interactive graphic tracking mapping for the particular item by playing the relevant audio and/or video message that had been save in association with the item.

As another example, a sending user may wish to provide a list of the contents of the package being shipped—the exemplary embodiment would present an interactive interface for the user to input textual information; when the user clicked, e.g., "Complete" or some other terminating online command, the exemplary embodiment would store the relevant textual information in an association with the item, such as with an item-specific identifier or tracking identifier.

In some exemplary embodiments, in addition to, and/or instead of, the above-mentioned shipping history or other local visual tracking of the item, the exemplary embodiment would facilitate the user providing instructions for generating and/or posting a link, and/or an "App" (an executable software application that may be downloaded to and executed by, for example, an intelligent telephone/computer). As illustratively depicted in FIGS. 5A and 5B, the exemplary embodiment there depicted would facilitate a user's input of an instruction field 492 that would instruct the exemplary embodiment where to post a visual tracking link and/or App. An exemplary Post-to instruction pull-down menu 493 is depicted in FIG. 5B from which the user could select options such as the users own email ("my email"), one of various social network websites, another email address, another (not listed) social network website, or the website of the exemplary embodiment only. If the user selected "another email" address or "another social network", the exemplary embodiment would display a "Tell us Where" input field 496 (as depicted in FIG. 5A) into which the user would need to enter the appropriate email or Internet address of the other social network website.

According to the users instructions, the exemplary embodiment would generate a link and/or an App and would post the link and/or App to the recipient(s) indicated by the user. Where the user indicated that the visual tracking link and/or App should be posted to a social network (e.g., to the users profile, or news page, or the like), the exemplary embodiment would facilitate user input (not shown) of any further user authorization(s)/permission(s) that would be required for posting the visual tracking link and/or App to the particular social network. With the appropriate user authorization(s)/permission(s), the exemplary embodiment would then post the visual tracking link and/or App to the user-indicated location(s), implementing, as appropriate, a social-network-specific posting gateway. Some exemplary embodiments would facilitate the user identifying multiple posting/emailing locations.

In some exemplary embodiments, a user could request such interactive graphic mapping and tracking of an item even if the shipping/mailing indicia of the item had not been produced by the system of the exemplary embodiment—in such an exemplary embodiment, the user would need to input some identification information, such as, for example, a tracking identifier, such as a carrier-specific tracking identifier (and in some embodiments, additional information, such as, for example an identification of a carrier, and/or other information about the particular item to be tracked).

For visual tracking of a single item, the exemplary embodiment would create a single map with a projected route for shipment/mailing of the item; the exemplary embodiment would create a "feed" (such as a real-time feed) to update the map and the projected route with tracking event data, to show an actual route, an estimated current location and a current status.

The exemplary embodiment would generate a geographical depiction of a map with a scope great enough to show the Origin (address/city), the Destination (address/city), and the Projected Route, including each carrier-specific processing facility and/or "hub" that would be projected (according to carrier-specific rules) to be used to process shipping for the item.

Once a map has been created, the exemplary embodiment would create a link, such as a hypertext link, and/or a plain text link, to a webpage that would display/provide a depiction of an exemplary interactive Map and the Projected Route (such as illustratively depicted in FIGS. 8-11), with feeds to show "to-date/time" progress on the route, and/or to update the Projected Route based on actual events. In the event that some social networks would not allow hypertext links, then a plain text link could be posted to the social network, to be copied to a viewing user's browser.

In addition to, or instead of, a link, some exemplary embodiments would generate an item-specific, self-actuating/self-executing/self-expanding "App" (an executable software Application, including software that may be downloaded to, and/or sent to, an intelligent telephone and/or intelligent computer devices (either the user's intelligent telephone or intelligent computer device, or an intelligent telephone of intelligent computer designated by the user)). Once the item-specific item has been sent or posted, e.g., to a user's intelligent telephone/computer and/or to a social network page, the App would execute to expand to display the item-specific tracking map and projected route; the App would provide "feeds" to graphically depict updated progress/location and/or alerts.

Further, as previously mentioned above, the present invention is not limited to implementation regarding mailing and/or shipping items using a single carrier for an entire delivery path for an item. Rather, the present invention would apply equally to circumstances where multiple carriers and/or delivery services cooperate to progress an item along a delivery path from an origin location to a destination location. For example, in some exemplary embodiments, an item's delivery route may include different "legs" that are facilitated using different respective carriers. For example, a first leg of a delivery path of an item may be facilitated using an exemplary Carrier A; a second leg of the delivery path for the item may be facilitated using an exemplary Carrier B; etc.; and a final leg of the delivery path for the item may be facilitated using an exemplary Carrier X.

Such an exemplary multi-carrier-delivery-service path embodiment would receive tracking event data, such as scan event data, and/or historical information as the case may be, whether in non-standardized, carrier-specific formats or in standardized formats, from each carrier and delivery service that carried the particular item; the exemplary embodiment would standardize, or otherwise interpret, non-standardized formats, of tracking and/or historical event data received from various carrier sources. For example, such an exemplary embodiment would maintain a database, or other record, of information needed to interpret information received from each particular carrier/delivery service and translate the carrier-specific information into a common, or standard, format or set of information, and provide a single interactive graphic tracking mapping showing each of the carrier-specific/delivery-service-specific "legs" of the delivery path.

Such an exemplary multi-carrier-delivery-service-path embodiment would track interactions between the multiple carriers and delivery services, including transfers of the item from one carrier/delivery service to the next carrier/delivery service; in some such exemplary embodiments, changes in actual carrier/delivery service handling as compared to the projected/selected path approved by the shipping user would be recognized and reported.

Figure 7:
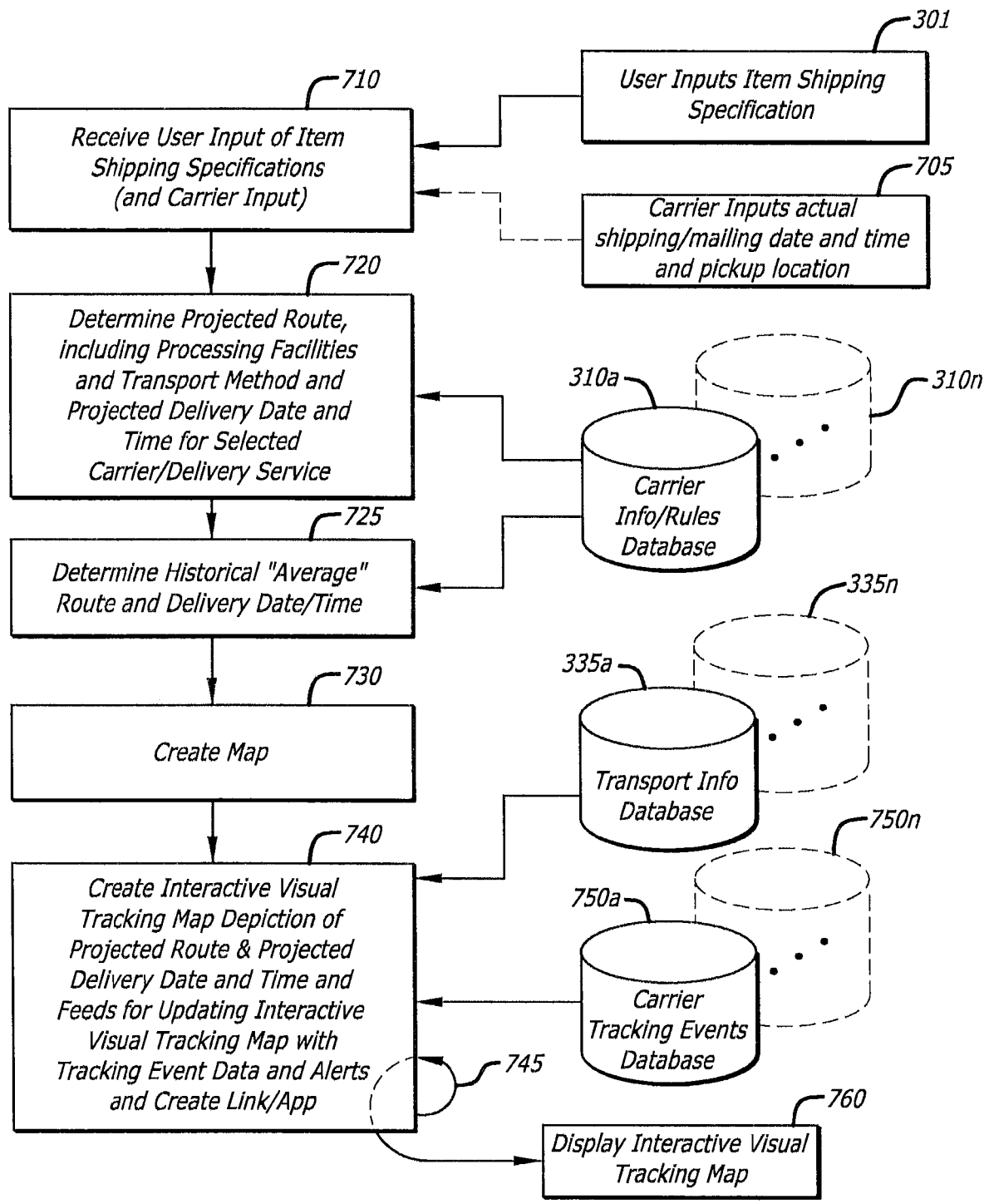
FIG. 7 depicts exemplary high level log functions in an exemplary high level logic flow for an exemplary embodiment's creation of an exemplary item-specific interactive visual tracking map and related link and/or "App" (an application) in an exemplary embodiment of the present invention.

FIG. 7 depicts exemplary high-level logic functions for determining and generating a map and a projected route for a particular carrier and a particular delivery service to ship a particular item from an Origin location to a particular Destination. As depicted in FIG. 7, an exemplary embodiment would receive 710 various user input 301 and/or carrier input information 705, such as, for example (not shown): Item Origin; Item Destination; Item Shipping Specifications (e.g., Weight, Size (e.g., oversized); Item Dimensions; Item Weight; Shipping/Mailing Date and Time (an anticipated shipping/mailing date and time would be a user input; an actual shipping/mailing date and time could be a carrier input, such as an initial shipping/mailing stream entry scan that the exemplary embodiment would use, if/when available to refine the projected route); Pick-up Location (the user could input an anticipated pick-up location; an actual pick-up location comprising a carrier input could be used if/when available to refine the projected route); Selected Carrier(s); Selected Delivery Service(s) (e.g., Next Day, 2-Day, etc.). As will be understood by someone with ordinary skill in the art, the creation of a map could initially be done with only the user's shipping specifications and anticipated shipping/mailing date and time, and/or pick-up location and could then later be refined/revised according to carrier input of an actual shipping/mailing date and time and/or actual pick-up location.

Continuing with reference to FIG. 7, the exemplary embodiment would access exemplary Carrier Routing/Networking/Hubs information and "rules" databases 310 (-310n) for the selected carrier and for the selected delivery service and would determine 720 a projected route, including carrier-specific processing facilities and transport method(s), and a projected delivery date and time for the selected carrier and delivery service.

The exemplary embodiment would access exemplary Carrier Routing/Networking/Hubs information and "rules" databases 310 (-310n) for the selected carrier and for the selected delivery service and would also determine 725 an historical "average" route and delivery date and time based on statistics for the selected carrier and delivery service.

The exemplary embodiment would create a map 730 that would include the Origin (address/location), the Destination (address/location) and intermediate routing "hubs" or processing facilities that would be used by the selected Carrier and/or the selected Delivery Service, according to the Carrier Routing/Networking/Hubs information and "rules". The exemplary embodiment would create the map (730) to encompass a scope that would preferably include the entire geographic area that would be covered by the Projected Route, whether that is a section of a single city, an entire city, a section of a State, or an entire state, a region of a country or a continent, or an entire country or continent, or a group of countries and/or continents (and intervening geographic ocean areas). For example, if a carrier is to deliver an item from Delaware to California, and the carrier has a "hub" in Atlanta, then the exemplary embodiment would create a Map with a scope that would show the part of the U.S. that includes Delaware, Atlanta, California and everything in between along the projected route.

As previously mentioned above, the present invention is not limited to destinations within the United States. Rather, exemplary embodiments would facilitate visual route projections and tracking to destinations involving any combination of U.S. and foreign locations.

Continuing with reference to FIG. 7, using data from transport information data base 335a (-335n) relevant to the carrier and/or the projected route, and using data from a carrier tracking events data base (e.g., for the selected carrier) 750*a* (-750*n*), the exemplary embodiment would create 740 an exemplary item-specific interactive visual tracking map depiction of the map and the projected route and the projected delivery date and time, with "feeds" for updating the exemplary item-specific interactive visual tracking map with carrier-provided tracking event data and alerts; the exemplary embodiment would create (740) a link and/or an App to/for the exemplary item-specific interactive visual tracking map that could then either be emailed to the user or to an email address provided by the user, and/or posted to a social networking site as instructed by the user, and/or sent to the user's intelligent telephone or other computer device.

The exemplary item-specific interactive visual tracking map would show, e.g., with special icons, each delivery method (e.g., truck, airplane, train, etc.) for each "leg" of the Projected Route. Further, the exemplary item-specific interactive visual tracking map would show, such as with highlighting or flashing, any alerts along the projected route, such as, for example, various types of transport and/or delivery alerts, e.g., mail facility down, airport traffic weather problem, road condition issues, etc.

Some exemplary embodiments would additionally depict on the exemplary item-specific interactive visual tracking map the "historical average" route and delivery date and time previously mentioned above. For example, an historical average route and delivery date and time could be shown in a different color than the item-specific projected route and delivery date and time.

FIG. 8 is a graphic depiction of an exemplary item-specific interactive visual tracking map 800 for a particular item being shipped by an exemplary carrier 802 (Carrier A) using an exemplary delivery service 804 (Service X) (the carrier 802 and delivery service 804 having been selected by the relevant user). FIG. 8 depicts an exemplary timeline 859 across the bottom of the exemplary item-specific interactive visual tracking map 800, Exemplary timeline 859 comprises an exemplary display of an exemplary shipping date 840 and an exemplary shipping time 842. Exemplary timeline 859 further comprises an exemplary display of an exemplary current date 844 and current time 846, and an exemplary projected delivery date 848 and a projected delivery time 850.

FIG. 8 depicts exemplary item-specific interactive visual tracking map 800 comprising an interactive projected route (elements 806, 807, 812, 816, 822, 826 and 830) to ship the particular item 817 from Origin Address/City 806 to Destination Address/City 830. In addition to showing the Origin Address/City 806 and the Destination Address/City 830, the exemplary interactive projected route further comprises multiple projected route elements, including exemplary route portions, or "legs" 807, 816/818/820, and 826, and exemplary carrier-specific/delivery-service-specific processing facilities 812 and 822.

FIG. 8 further depicts exemplary projected route leg transport method icons 810, 814 and 828 that depict the type of transport method projected for the relevant leg of the projected route. FIG. 8 further depicts a (an estimated) current status/location of the item 817, which is denoted by a combination of a user-specified item-specific item icon 817 (and/or which could also be labeled with a user-specified Nickname) and an exemplary current status icon 818. Exemplary embodiments could depict an exemplary current status icon 818 as a flashing element, or with a special color, or with a "lighting" effect, or with other graphic characteristics, whether now known or in the future discovered.

Based on actual carrier/delivery-service tracking "events", the exemplary item-specific interactive visual tracking map 800 depicted in FIG. 8 depicts portions and processing facilities (807, 812 and 816) of the projected route that have been "completed" as of the current date 844 and current time 846 with a slanted hash mark; portions of the projected route that remain to be completed as of the current date 844 and current time 846 are depicted as blank bars having solid outlines.

As will be understood by someone with ordinary skill in the art, the present invention is not limited to the particular illustrative graphic characteristics depicted in the exemplary drawings of this application. Rather, there would be various ways to depict projected routes, historical routes and other tracking elements, using various colors, graphic effects, and the like, without varying from the spirit of the present invention.

The exemplary item-specific interactive visual tracking map 800 depicted in FIG. 8 illustratively depicts an "alert" 824 for exemplary carrier processing facility 822; exemplary embodiments could depict an exemplary alert 824 as a flashing element, or with a special color, or with a "lighting" effect, or with other graphic characteristics, whether now known or in the future discovered.

FIG. 8 also depicts an exemplary "historical average" route for an item from Origin Address/City 806' to Destination Address/City 830'. The exemplary "historical average" route comprises historical route elements (depicted with dotted lines, but which could be depicted with different colors, or different graphic characteristics), including exemplary historical route portions, or "legs" 807', 816'/818'/820', and 826', and exemplary historical average carrier-specific/delivery-service-specific processing facilities 812' and 822'.

FIG. 8 further depicts exemplary historical route leg transport method icons 810', 814' and 828' that depict an exemplary type of transport method that would, on "average", have been used to transport a similar item over the relevant leg of the historical route. FIG. 8 further depicts an exemplary (estimated) "current" historical status/location, which is denoted by an exemplary current historical status icon 818'. FIG. 8 also depicts an exemplary historical average delivery date 860 and an exemplary historical average delivery time 862 when, based on historical statistics by the same carrier and the same delivery service, items of similar characteristics are projected to have been, on average, delivered to the historical average Destination Address/City 830 when having been shipped from the historical average Origin Address/City 806 on the shipping date and time.

Figure 9:
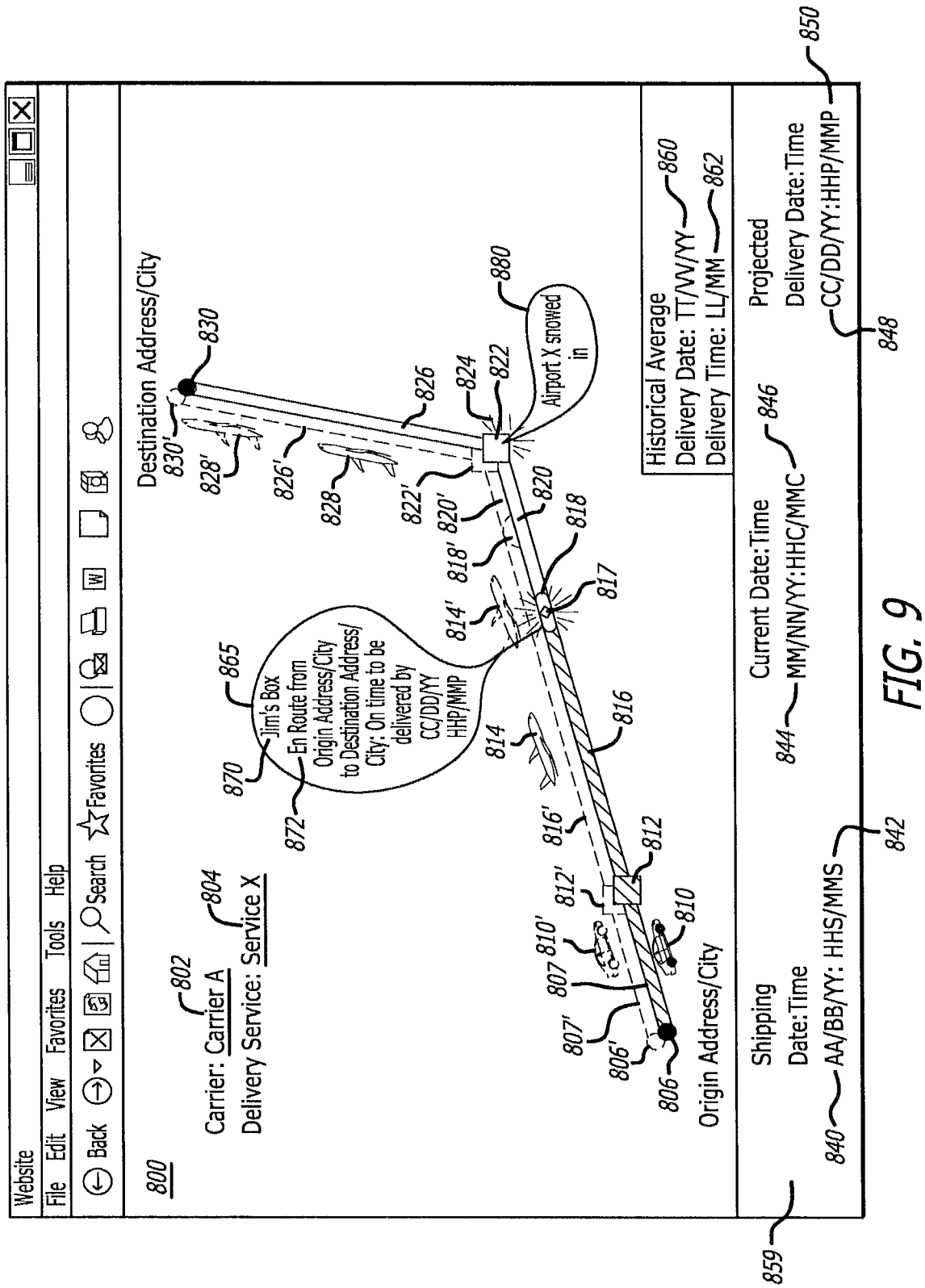

The exemplary item-specific Interactive visual tracking map 800 depicted in FIG. 8 would provide interactivity. For example, as depicted in FIG. 9, a user could place the user's cursor over a particular element of the exemplary item-specific interactive visual tracking map 800 and by, for example, hovering the cursor over the element, or clicking on the element, and in response, the exemplary embodiment would cause an exemplary insert window display, e.g., 865, 880, that would provide details regarding that particular element. For example, if a user placed the user's cursor over the exemplary item icon 817, the exemplary embodiment would display in an exemplary insert window display 865 that would indicate, for example, the item's user-defined Nickname 870 and information about the status of the shipment 872. As another example of interactivity, if a user placed the user's cursor over the exemplary processing facility 822 (for which there is depicted an exemplary alert 824), the exemplary embodiment would display in an exemplary insert window display 880 that would indicate, for example, detailed information about the alert for that facility.

Whatever method may be used in a particular exemplary embodiment to trigger generation of interactive graphic mapping and tracking, for an item that is mailed using a particular carrier, the exemplary embodiment would monitor tracking events, such as, for example, scanning events, for the particular carrier in order to identify tracking events for the particular item, according to the tracking identifier. For example, for an item that is mailed using the United States Postal Service (the "USPS"), exemplary embodiments of the present invention would monitor USPS scanning events (e.g., would read and analyze digital records of USPS scanning events) for scanning events associated with the particular Identifier, e.g., the tracking identifier, that is associated with the particular item. For example, if the user had selected the USPS as the carrier for shipping the particular item, and if the user had selected USPS Express Mail as the USPS delivery service/method for shipping the item, the exemplary embodiment would search USPS scan event records for scan events for the USPS Express Mail Tracking identifier associated with the item. Alternatively, if the user had selected USPS First-Class Mail for mailing the item, the exemplary embodiment would search USPS scan event records for scan events for the Intelligent Mail Barcode associated with the item.

The present invention is not limited to tracking based on actual scan events. Alternatively, exemplary embodiments would generate and provide exemplary interactive graphic "tracking" mapping for an item, even in the absence of actual scan data for the item, such as, for example, based on, in whole or in part, historical tracking data for similar items, such as for items sent using the same or similar carrier and using the same or similar delivery service (e.g., Express, Overnight, First Class, etc.) from the same or nearby origin to the same or nearby destination. Such exemplary embodiments of the present invention would update the interactive graphic mapping for the item according to actual tracking events and/or based on historical data and/or as a function of time from item pickup.

Continuing with reference to FIG. 7, an exemplary logic loop 745 is illustratively depicted to show that the exemplary interactive visual tracking map creation process 740 is repeatedly performed to update the exemplary item-specific interactive visual tracking map with new carrier tracking event data (e.g., from exemplary Carrier tracking events data base(s) 750*a* (-750*n*)) and new transport information (e.g., from exemplary transport information data base(s) 335*a* (-335*n*)). The exemplary embodiment would display 760, or facilitate the display (e.g., through a user's browser software) of the exemplary item-specific interactive visual tracking map.

As actual tracking events are detected, the exemplary embodiment would, if appropriate, adjust/revise the "projected" route (including the completed portion(s) of the route, as well as remaining portions of the route) to reflect actual circumstances, e.g., due to transport issues, e.g., airport issues, weather, road conditions, detours, etc., according to particular delivery method for delivery service used.

It will be understood by someone with ordinary skill in the art that it would be possible that tracking identifiers could be assigned/generated in such a way that the tracking identifier would be unique for an item, regardless of carrier, it would be possible in such circumstances to search for scan events for the item without regard for an identification of a carrier. However, in such an embodiment, if each carrier provided a separate carrier-specific tracking event database, then the exemplary embodiment would either need to search all carrier tracking event databases, or alternatively would create a single database (physical or logical) that merged/consolidated all carrier tracking event databases and would search the single merged/consolidated carrier tracking event database for tracking events (and/or, in the absence of actual tracking events, for historical information, in conjunction with the amount of time that has elapsed from the item pickup (by the carrier) and/or the item drop-off (by the user)) for the particular item tracking identifier.

As a further alternative, it would be possible for some exemplary embodiments to use a direct feed, e.g., from a particular carrier and/or from multiple carriers, of tracking events, such as a real-time feed.

As will be understood by someone with ordinary skill in the art, the present invention is not limited to receiving current technology "scan" events. Rather, other tracking event technologies, whether now known or in the future discovered, (including, for example, disposable and/or reusable Global Positioning System ("GPS") elements that could be imbedded in or otherwise physically associated with a mail/shipping item) could be used by other exemplary embodiments of the present invention.

Further, as previously mentioned, in the absence of actual tracking events for a particular item, exemplary embodiments could use historical information, in conjunction with a determination of the amount of time that has elapsed from the item pickup (by the carrier) and/or the item drop-off (by the user) in order to provide a type of "tracking" of the status of an item. Exemplary historically-based tracking would comprise a projection or estimation of an item's shipping/delivery status, rather than an actual status. In some exemplary embodiments, historical information would be used in conjunction with actual tracking (e.g., scanning) events to project/estimate a location/status of an item, such as in circumstances where some period of time had passed without receiving an actual tracking event update.

An exemplary historical-based tracking projection embodiment would, for example, compute an historical average of a location, as a function of time elapsed from a user-drop-off event and/or a carrier-pickup event, for items sent using the same or similar carrier(s) and using the same or similar delivery service(s) (e.g., Express, Overnight, First Class, etc.) from the same or nearby origin to the same or nearby destination.

In some such exemplary historical-based tracking projection embodiments, any portion of an exemplary interactive graphic "tracking" mapping that is based, in whole or in part, on historical data (as compared to actual tracking events) would be depicted in a graphically distinctive manner from delivery/shipping tracking segments depicted based on actual tracking events. For example, an exemplary interactive graphic tracking mapping of segments based on actual tracking events would be depicted in a solid line; segments based on historical data would be depicted in a dashed line.

An exemplary historical-based tracking projection embodiment would, for example, wait for a pre-set period of time before computing a projection based on historical data. In such an exemplary embodiment, the pre-set period of time could be set globally for an entire tracking system by a system administrator, or alternatively, could be set for tracking a particular item by a shipping user, or even by a recipient user. If the exemplary embodiment did not receive an actual tracking event update for an item by the pre-set period of time, the exemplary embodiment would compute a projection based on historical data. If, on the other hand, the exemplary embodiment received an actual tracking event update for the item before the expiration of the pre-set period of time, the exemplary embodiment would graphically depict the actual location/status of the item and would re-initialize a timer for the pre-set period of time.

Exemplary actual tracking event data would comprise, for example, an Event Type identifier (e.g., scan event); an Event Status type (e.g., pickup, delivery, in-transit, out-for-delivery); and Event Location (such as, for example, a longitude/latitude location).

The exemplary embodiment would determine a most recent location of the item along the exemplary projected route based on "scan" or other actual tracking event data. If, due to actual circumstances, the completed portion and/or remaining portions of the projected route had changed from the originally projected route, the exemplary embodiment would revise the route, including the completed portion and/or the remaining portions, as the case may be, of the "projected" route to reflect actual circumstances—e.g., due to transport issues, such as, for example, airport issues, weather, road conditions, detours, etc., according to particular delivery method for delivery service used.

Some exemplary embodiments would depict an exemplary actual route (revised as appropriate from the originally projected route, based on actual tracking events, etc.) and the revised estimated/projected delivery date/time, as, for example, a "ghost overlay" over the originally projected route; in other exemplary embodiments, the projected and actual routes would be depicted with color-coding and/or special graphics (e.g., showing a solid line for an actual route; showing a dashed or hashed line for a projected route).

Figure 10:
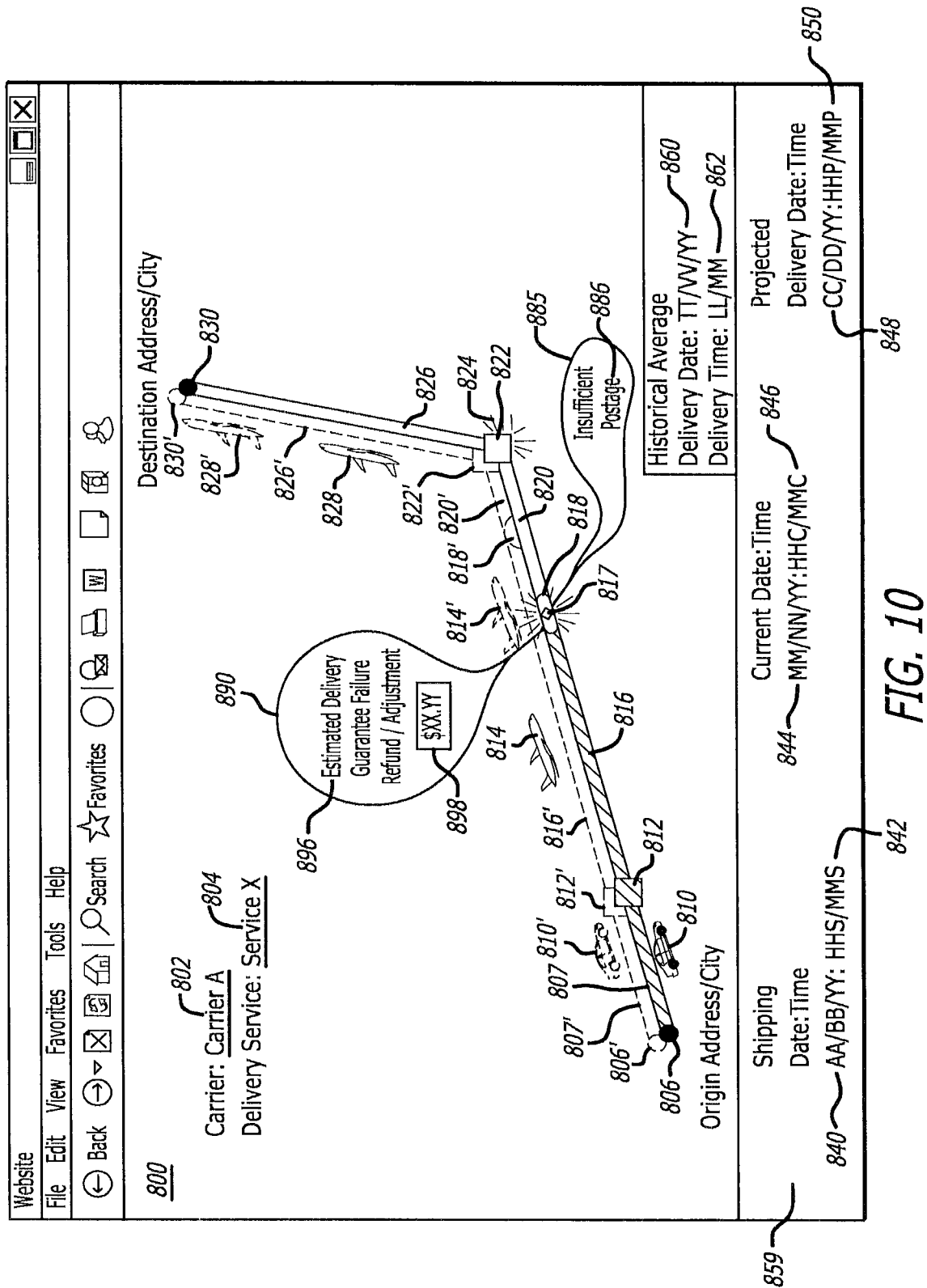

The exemplary embodiment would provide an exemplary Guarantee Delivery Date/Time refund option as depicted in FIG. 10. For example, for carrier/delivery services for which the carrier/delivery service guarantees a delivery date and/or a delivery date and time (e.g., next-day by 3 pm), where the actual route/projected shows that the guarantee date/time (based on the actual ship date/time) will not be met (e.g., the guarantee delivery date/time has passed prior to delivery of the item), the exemplary embodiment would display (see element 890) an estimated reimbursement/refund or billing adjustment amount 896/898 (depending on the carrier) that a shipping user would be able to collect from the carrier due to the delay; the exemplary embodiment would provide an interactive field (e.g., exemplary element 898) to allow the sender to file a request for a reimbursement/refund.

The exemplary embodiment would monitor en route shipping/mailing events and would interactively notify the user of en route alerts, including en route alerts that the user may be able to correct. Based on tracking events, e.g., carrier tracking events, whether carrier scanning events, or other carrier and/or item tracking events whether now known or in the future discovered, the exemplary embodiment would interactively notify the user of any en route alerts (see, e.g., FIG. 10, element numbers 885/886) such as, for example, insufficient postage, recipient not available for signature, illegible delivery address, missing item (e.g., an item for which no recent scan events have been encountered), etc.

The exemplary embodiment would provide an interactive interface for the user to correct certain en route alert circumstances, e.g., pay/authorize payment of, additional postage for insufficient postage, change delivery instructions (e.g., change "require signature" to "leave without signature"), provide a new input of the delivery address, etc. For example, in the exemplary embodiment, the exemplary en route alert 885/886 would comprise an interactive window, that if clicked by the user's cursor would cause a display of an interactive screen with alert-specific input fields with which the user would be able to input information to resolve the particular alert. For example, in the exemplary embodiment, the exemplary en route alert 885/886 for Insufficient Postage would comprise an interactive window, that if clicked by the user's cursor would cause a display of an interactive screen with interactive fields (not shown) with which the user could provide a payment method (such as with a credit card) and/or a payment authorization (such as to an existing account) to pay the insufficiency amount. Or, for an alert that depicted an illegible address, the exemplary embodiment would display an exemplary alert that if clicked by the user's cursor would cause a display of an interactive screen with interactive fields (not shown) with which the user could input the recipient's address.

Figure 11:
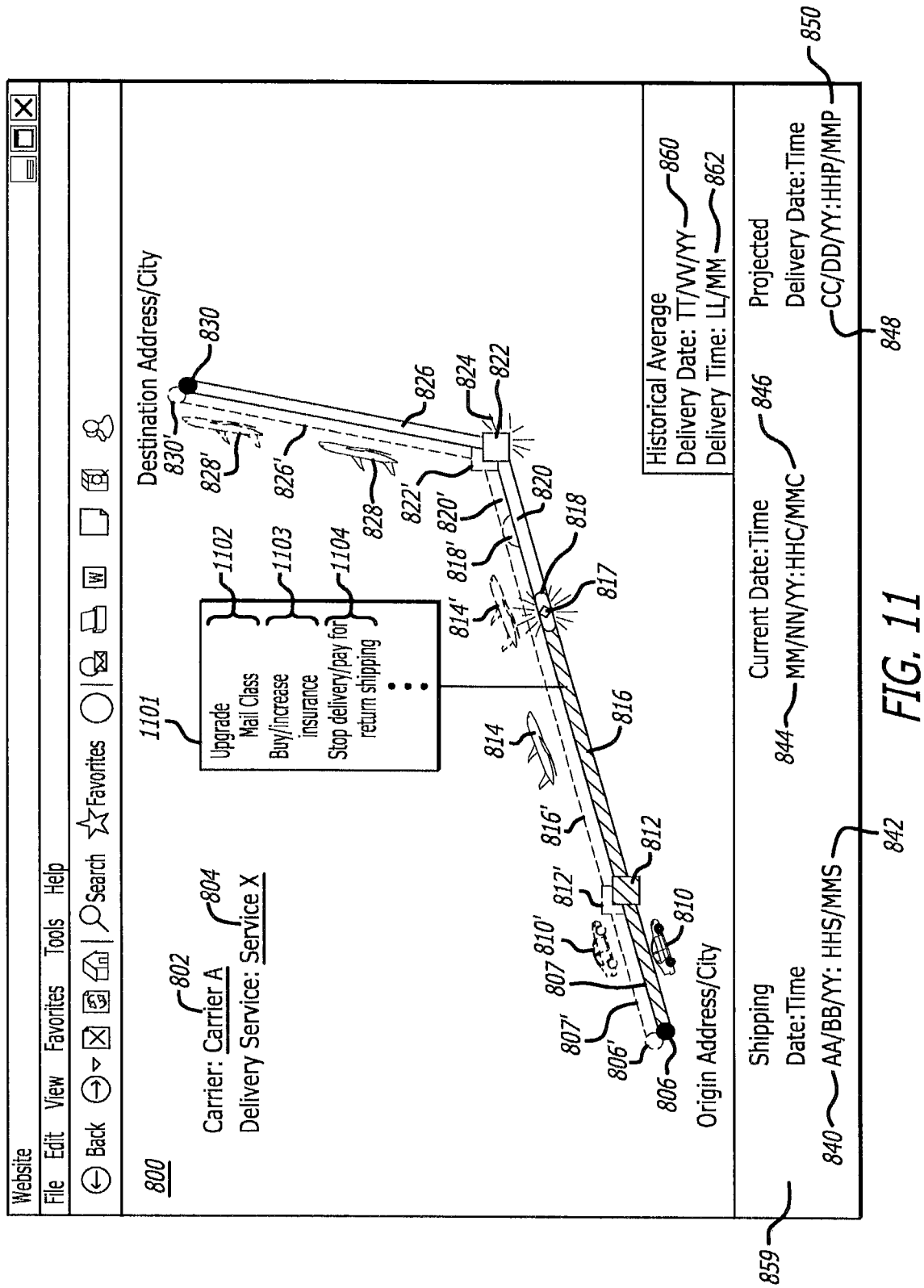

Similarly, the exemplary embodiment would monitor en route shipping/mailing events and provide an interactive interface for user-modification of mailing/shipping parameters. For example, as depicted in FIG. 11, an exemplary user could hover the user's cursor over a portion of an item's interactive graphic mapping route and, for example, right click; doing so would be recognized by the exemplary embodiment as a request for interactive en route service modification and would result in an interactive display 1101 of various en route service modification options. As a non-limiting, illustrative example, the exemplary embodiment would provide an interactive option 1103 to activate an exemplary user interface (not shown) to purchase or increase shipping/mailing insurance coverage for an en route item. As another non-limiting, illustrative example of providing interactivity for user-modification of mailing/shipping parameters, the exemplary embodiment would provide an interactive option 1102 to activate an exemplary user interface (not shown) to change (such as, for example, upgrade) delivery service/mailing class for the item, and pay any corresponding additional fees. As yet another non-limiting, illustrative example of providing interactivity for user-modification of mailing/shipping parameters, the exemplary embodiment would provide an interactive option 1104 to activate an exemplary user interface (not shown) to stop delivery of an item and pay for return shipping (or other disposal) of the item.

Some exemplary embodiments would provide a proactive package loss prevention/issue alert if no tracking event data is received for a particular item within a certain amount of time. In such an exemplary embodiment, the amount of time that would elapse before triggering a proactive package loss prevention/issue alert could vary, e.g., based on the particular carrier and delivery service, and as a function of time from package drop-off and/or pickup. The exemplary embodiment would provide proactive package loss prevention/issue alerts and would facilitate user-interactivity with the relevant carrier to arrange for a replacement delivery, refunds, and/or other appropriate actions. For example, for a particular item, that had been sent using, for example, First Class Mail® by the United States Postal Service, if a scan event had not been received, as an illustrative, non-limiting example, within, e.g., eighteen (18) hours from the shipping user's indication of a drop-off, the exemplary embodiment would alert, for example, both the shipping user and the receiving user and would provide an interactive graphic user interface that would facilitate, for example, a request by the shipping user to resend a replacement item using a higher-priority delivery service, e.g., Express Mail.

Alternatively, or in addition to alerting a shipping user, the exemplary embodiment, in such circumstances, could report the alert to the recipient so that the recipient could arrange for a replacement item. For example, if an ordering user had ordered from a product supplier a part that was needed for a project, the ordering user could request interactive visual graphic tracking through the exemplary embodiment; the product supplier would ship the part to the ordering user in such a way as to facilitate interactive visual graphic tracking through the exemplary embodiment; the exemplary embodiment would track the shipment of the item, and if during some exemplary period of time, such as, for example, an exemplary period of twelve (12) hours (or as appropriate for the particular carrier(s) and the particular delivery service(s) responsible for shipping the item), no tracking events were reported to and received by the exemplary embodiment for the particular item, the exemplary embodiment would notify, for example, both the product supplier and the ordering user (the recipient). At that point, the ordering user, for example, could choose, such as to prevent compromising the relevant project schedule, to arrange for a replacement item to be sent, and could agree to pay increased shipping costs for shipping the item using a higher-priority delivery service, such as for overnight delivery.

Further, the exemplary embodiment, would, for example, provide automatic interaction between the relevant users and, for example, automated carrier issue resolution services, such as the USPS's Business Service Network eService, to request refunds for postage or shipping fees for lost items. For example, the exemplary embodiment would automatically present an electronic filing request to the relevant user to electronically request a refund for postage and/or insurance coverage for the missing item from the USPS Business Network Support System eService; the exemplary embodiment would automatically pre-populate fields in the electronic filing request with data regarding the item sent and information regarding the absence of actual tracking events for the item. Once the user had completed and authorized the electronic filing request, the exemplary embodiment would electronically "file" the request with the relevant carrier/system.

Further, in some exemplary embodiments, after the electronic "filing" of such a lost-item request, the exemplary embodiment would issue follow-up status checks both for the item and for the lost-item request; would provide follow-up information to the relevant carrier system regarding the absence, and timing of the absence, of actual tracking events for the item; and would notify the requesting user when a carrier-resolution of the matter is received.

Returning with reference to FIG. 7, exemplary embodiments of the present invention would generate (see element 740) a link, such as a hypertext link, or a plain text link, that a user could email to others or could post to, for example, a social networking website; an exemplary link would be a link to a webpage that would display/provide a depiction of the interactive graphic mapping of the projected carrier-specific, delivery-specific route, with status updates showing "to-date/time" progress on the route; the interactive graphic mapping of the projected carrier-specific, delivery-specific route would be updated as appropriate to reflect routing changes according to actual "events," such as scan events for the Identifier associated with the item.

Based on user-provided instructions, the exemplary embodiment could email the user the link and or send the link to the users intelligent telephone or other intelligent computer device. In addition or alternatively, based on user-provided instructions, the exemplary embodiment could post the link to a social network identified and authorized by the user, with permissions from the user and/or through a Gateway for posting a link to a social network. The exemplary link created by the exemplary embodiment could be in plain text form or other form, such as a hypertext link.

An exemplary link created by the exemplary embodiment and provided to the user could be copied by the user for posting in social network or could be "auto-posted" to one or more designated social networks with the appropriate user-provided user permission(s) and/or authorization(s), and/or e.g., could be posted to a social network through a link posting Gateway to a social network such as through a secure link-posting Gateway to one or more social networks.

As an alternative to, or in addition to, a link, the exemplary embodiment would create an item-specific, self-actuating/self-executing/self-expanding "App" (an executable software Application, including software that may be downloaded to, and/or sent to, an intelligent telephone and/or other intelligent computer devices (either the user's intelligent telephone or intelligent computer device, or an intelligent telephone of intelligent computer designated by the user)); the exemplary item-specific App would comprise executable software that, when executed, would create a display of the exemplary item-specific, interactive visual tracking map (see element 800 in FIG. 8) and (projected and historical average) Routes and provides "feeds" for updating the Map and Routes with actual tracking events. The exemplary embodiment would post the exemplary item-specific, self-actuating/self-executing/self-expanding App according to user-provided instructions, to social network identified and authorized by user or would email the App to the user or to an email address provided by the user.

An exemplary item-specific, self-actuating/self-executing/self-expanding App, when received by a user's intelligent telephone/computer, and/or when posted to a social networking site, would execute to create a display of the exemplary item-specific, interactive visual tracking map (see element 800 in FIG. 8) and (projected and historical average) Routes and would, according to the App's "feeds", would update the Map and Routes with actual tracking events.

FACSIMILE REPRODUCTION OF COPYRIGHT MATERIAL

A portion of the disclosure of this patent document contains material which is subject to copyright protection by the copyright owner, Stamps.com Inc., and its successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A system for facilitating item tracking visualization via time-triggered presentation of a tracking event prediction, the system comprising:
a computer system comprising one or more processors programmed with computer program instructions that, when executed, cause the computer system to:
obtain historical information related to tracking of previously-shipped items, the historical information indicating scan events for the previously-shipped items, carriers used to ship or deliver the previously-shipped items, shipping services used to ship or deliver the previously-shipped items, or routes used to ship or deliver the previously-shipped items;
determine a first predetermined time period related to shipment of a first item and a second predetermined time period related to shipment of a second item;
obtain, prior to an expiration of the first predetermined time period, a first tracking event update related to the first item, the first tracking event update indicating a current location of the first item;
predict a current location of the second item based on the historical information;
generate, based on the prediction, a predicted tracking event update related to the second item such that the predicted tracking event update indicates the predicted current location of the second item; and
generate, and send to a user device, an item-specific, self-executing application configured to perform the following operations:
cause, based on the first tracking event update being obtained prior to the expiration of the first predetermined time period, a graphical representation of the first tracking event update to be presented on a user interface; and
cause, based on a lack of a tracking event update occurring by an expiration of the second predetermined time period, a graphical representation of the predicted tracking event update related to the second item to be presented on a user interface, the graphical representation of the predicted tracking event update indicating the predicted current location of the second item.

2. The system of claim 1, wherein the computer system is caused to:
determine that the second predetermined time period expired prior to obtaining a second tracking event update related to the second item,
wherein causing the graphical representation of the predicted tracking event update to be presented comprises causing the graphical representation of the predicted tracking event update to be presented on a user interface based on the determination that the second predetermined time period expired prior to obtaining a second tracking event update related to the second item.

3. The system of claim 1, wherein the computer system is caused to:
re-initialize, based on the first tracking event update being obtained prior to the expiration of the first predetermined time period, the first predetermined time period such that the expiration of the first predetermined time period is extended to a subsequent time; and
cause, based on a lack of a tracking event update occurring by the extended expiration of the first predetermined time period, a graphical representation of a predicted tracking event update related to the first item to be presented on a user interface, the predicted tracking event update related to the first item (i) indicating a subsequent current location of the first item and (ii) being based on the historical information.

4. The system of claim 1, wherein the first tracking event update indicates a scan event that occurred at the current location of the first item, and wherein the predicted tracking event update is based on the scan events for the previously-shipped items.

5. The system of claim 1, wherein the predicted tracking event update is based on the carriers used to ship or deliver the previously-shipped items.

6. The system of claim 1, wherein the predicted tracking event update is based on the shipping services used to ship or deliver the previously-shipped items.

7. The system of claim 1, wherein the predicted tracking event update is based on the routes used to ship or deliver the previously-shipped items.

8. The system of claim 1, wherein the first tracking event update indicates a scan event that occurred at the current location of the first item, and wherein the predicted tracking event update is based on (i) the scan events for the previously-shipped items, (ii) the carriers used to ship or deliver the previously-shipped items, (iii) the shipping services used to ship or deliver the previously-shipped items, and (iv) the routes used to ship or deliver the previously-shipped items.

9. The system of claim 1, wherein the predicted tracking event indicates the predicted current location of the second item, a predicted current route of the second item, and a predicted future delivery time of the second item.

10. A method for facilitating item tracking visualization via time-triggered presentation of a tracking event prediction, the method being implemented by one or more processors executing computer program instructions that, when executed, perform the method, the method comprising:
obtaining historical information related to tracking of previously-shipped items, the historical information indicating scan events for the previously-shipped items, carriers used to ship or deliver the previously-shipped items, shipping services used to ship or deliver the previously-shipped items, or routes used to ship or deliver the previously-shipped items;
determining a first predetermined time period related to shipment of a first item and a second predetermined time period related to shipment of a second item;
obtaining, prior to an expiration of the first predetermined time period, a first tracking event update related to the first item, the first tracking event update indicating a current location of the first item;
predicting a current location of the second item based on the historical information;
generating, based on the prediction, a predicted tracking event update related to the second item such that the predicted tracking event update indicates the predicted current location of the second item; and
generating, and sending to a user device, an item-specific, self-executing application configured to perform the following operations:
causing, based on the first tracking event update being obtained prior to the expiration of the first predetermined time period, a graphical representation of the first tracking event update to be presented on a user interface; and causing, based on a lack of a tracking event update occurring by an expiration of the second predetermined time period, a graphical representation of the predicted tracking event update related to the second item to be presented on a user interface, the graphical representation of the predicted tracking event update indicating the predicted current location of the second item.

11. The method of claim 10, further comprising:
determining that the second predetermined time period expired prior to obtaining a second tracking event update related to the second item,
wherein causing the graphical representation of the predicted tracking event update to be presented comprises causing the graphical representation of the predicted tracking event update to be presented on a user interface based on the determination that the second predetermined time period expired prior to obtaining a second tracking event update related to the second item.

12. The method of claim 10, further comprising:
re-initializing, based on the first tracking event update being obtained prior to the expiration of the first predetermined time period, the first predetermined time period such that the expiration of the first predetermined time period is extended to a subsequent time; and
causing, based on a lack of a tracking event update occurring by the extended expiration of the first predetermined time period, a graphical representation of a predicted tracking event update related to the first item to be presented on a user interface, the predicted tracking event update related to the first item (i) indicating a subsequent current location of the first item and (ii) being based on the historical information.

13. The method of claim 10, wherein the first tracking event update indicates a scan event that occurred at the current location of the first item, and wherein the predicted tracking event update is based on the scan events for the previously-shipped items.

14. The method of claim 10, wherein the predicted tracking event update is based on the carriers used to ship or deliver the previously-shipped items.

15. The method of claim 10, wherein the predicted tracking event update is based on the shipping services used to ship or deliver the previously-shipped items.

16. The method of claim 10, wherein the predicted tracking event update is based on the routes used to ship or deliver the previously-shipped items.

17. The method of claim 10, wherein the first tracking event update indicates a scan event that occurred at the current location of the first item, and wherein the predicted tracking event update is based on (i) the scan events for the previously-shipped items, (ii) the carriers used to ship or deliver the previously-shipped items, (iii) the shipping services used to ship or deliver the previously-shipped items, and (iv) the routes used to ship or deliver the previously-shipped items.

18. The method of claim 10, wherein the predicted tracking event indicates the predicted current location of the second item, a predicted current route of the second item, and a predicted future delivery time of the second item.

\* \* \* \* \*